United States Patent
Beshai

(10) Patent No.: US 7,233,590 B2
(45) Date of Patent: Jun. 19, 2007

(54) SWITCHED CHANNEL-BAND NETWORK

(75) Inventor: Maged E. Beshai, Stittsville (CA)

(73) Assignee: Nortel Networks Limited (CA)

( * ) Notice: Subject to any disclaimer, the term of this patent is extended or adjusted under 35 U.S.C. 154(b) by 1129 days.

(21) Appl. No.: 09/960,959

(22) Filed: Sep. 25, 2001

(65) Prior Publication Data

US 2003/0007484 A1    Jan. 9, 2003

Related U.S. Application Data

(60) Provisional application No. 60/303,156, filed on Jul. 6, 2001.

(51) Int. Cl.
*H04L 12/50* (2006.01)
(52) U.S. Cl. .................. 370/380; 370/382; 370/384; 370/370
(58) Field of Classification Search ......... 370/380–385
See application file for complete search history.

(56) References Cited

U.S. PATENT DOCUMENTS 4,320,501 A  *  3/1982  Le Dieu et al. ............ 370/368
4,425,640 A  *  1/1984  Philip et al. ................ 370/380

(Continued)

OTHER PUBLICATIONS

Zang H et al: "Photonic Slot Routing In All—Optical Wdm Mesh Networks" 1999 Ieee Global Telecommunicatioins Conference. Globecom'99. Seamless Interconnection For Universal Services, Rio De Janeiro, Brazil, Dec. 5-9, 1999, Ieee Global Telecommunications Conference New York, Ny: Ieee, Us, vol. vol. 2, Dec. 5, 1999, pp. 1449-1453.

(Continued)

*Primary Examiner*—Wing Chan
*Assistant Examiner*—Andrew C. Lee
(74) *Attorney, Agent, or Firm*—McGuinness & Manaras LLP

(57) ABSTRACT

Rather than restricting a stream of data to a single channel within a multi-channel link between a source node and a core node, each channel is divided into time slots and the stream of data is distributed among these time slots in several channels. However, to ease the management of switching the stream of data at the core node, simultaneous time slots in each channel may be arranged into "stripes," such that a particular stripe may only include data segments having a common destination. Switching these stripes of data at the core node requires that the source of such a stripe arrange the frame according to a frame structure provided by the core node. Advantageously, where the frame is striped across an entire link, the present invention provides for a variation on link switching that approaches the topological reach of TDM switching while maintaining relatively straightforward operation at the core node. As the switching scheme requires time-locking between the core node and the source node, methods are provided for initializing, maintaining and recovering this time-locking while offsetting the effect of optical signal dispersion in multi-wavelength fiber links.

12 Claims, 16 Drawing Sheets

U.S. PATENT DOCUMENTS

| | | | | |
|---|---|---|---|---|
| 4,736,393 A * | 4/1988 | Grimes et al. | ............... | 375/356 |
| 4,872,159 A * | 10/1989 | Hemmady et al. | ........... | 370/352 |
| 4,875,206 A * | 10/1989 | Nichols et al. | ............. | 370/427 |
| 4,942,574 A * | 7/1990 | Zelle | ........................... | 370/400 |
| 5,091,905 A * | 2/1992 | Amada | ....................... | 370/415 |
| 5,107,489 A * | 4/1992 | Brown et al. | ............... | 370/360 |
| 5,475,679 A * | 12/1995 | Munter | ................... | 370/395.4 |
| 5,729,540 A * | 3/1998 | Wegrzyn | ................... | 370/336 |
| 5,784,372 A * | 7/1998 | Faulds | ........................ | 370/398 |
| 5,828,837 A * | 10/1998 | Eikeland | ..................... | 709/202 |
| 6,389,025 B2 * | 5/2002 | Sakurai et al. | .............. | 370/396 |
| 6,490,010 B1 * | 12/2002 | Shibuya et al. | ............. | 348/735 |
| 6,577,653 B1 * | 6/2003 | Rochberger et al. | ......... | 370/536 |
| 6,584,101 B2 * | 6/2003 | Hagglund et al. | ........... | 370/389 |
| 6,665,495 B1 * | 12/2003 | Miles et al. | ................... | 398/54 |
| 6,731,648 B1 * | 5/2004 | Cotter | ........................ | 370/458 |
| 6,789,765 B2 * | 9/2004 | Hopkins et al. | .......... | 244/129.3 |
| 6,907,005 B1 * | 6/2005 | Dahlman et al. | ........... | 370/236 |
| 7,085,849 B1 * | 8/2006 | Clark et al. | ................. | 709/234 |
| 2002/0085491 A1 * | 7/2002 | Beshai et al. | ................ | 370/230 |
| 2002/0147739 A1 * | 10/2002 | Clements et al. | ........... | 707/500 |

OTHER PUBLICATIONS

Chlamtac I et al: "Scalable Wdm Access Network Architecture Based On Photonic Slot Routing", Ieee / Acm Transactions On Networking, Ieee Inc. New York, Us, vol. 7, No. 1, Feb. 1999, Pages.

Kannan R et al: "Stwnet: A High Bandwidth Space—Time—Wavelength Multiplexed Optical Switching Network" Infocom '91. Sixteenth Annual Joint Conference Of The Ieee Computer And Commuications Societies. Driving The Information Revolution., Proceedings Ieee Kobe, Japan Apr. 7-11, 1997, Los Alamitos, Ca, Usa,Ieee Comput. Soc, Us, Apr. 7, 1991, Paces 777-784.

U.S. Appl. No. 09/286,431, filed Apr. 6, 1999, Beshai et al., "Self-Configuring Distributed Switch".

U.S. Appl. No. 09/550,489, filed Apr. 17, 2000, Beshai, "High-Capacity WDM-TDM Packet Switch".

* cited by examiner

SWITCHED CHANNEL-BAND NETWORK

REFERENCE TO RELATED APPLICATION

This application claims the benefit under 35 U.S.C. 199(e) of U.S. provisional application No. 60/303,156 filed Jul. 6, 2001 entitled "Switched Channel-Band Network" the contents of which are incorporated herein.

GOVERNMENT LICENSE RIGHTS

This invention was made with Government support under Technology Investment Agreement F30602-98-2-0194 awarded by the Air Force. The Government has certain rights in the invention.

FIELD OF THE INVENTION

The present invention relates to optical communication and, in particular, to switching channel-bands in an optical network.

BACKGROUND OF THE INVENTION

A data network comprises a number of source nodes, each source node receiving traffic from numerous traffic sources, and a number of sink nodes, each sink node delivering data to numerous traffic sinks. The source nodes can be connected to the sink nodes directly or through core nodes. Quite often, source nodes and sink nodes are paired so that a source node and its associated sink node are included within an edge node. The capacity of a given data network is determined by the capacities of the edge nodes and the core nodes.

Each link between nodes (source node to core node or core node to sink node) may comprise multiple channels. An optical multi-channel link uses Wavelength Division Multiplexing (WDM). WDM allows a given optical link to be divided into multiple channels, where a distinct stream of data may be transmitted on each channel and a different wavelength of light is used as a carrier wave to carry each of the multiple channels within the optical link.

A core node that connects source nodes to sink nodes using multi-channel links may be required to switch as much as an entire incoming link to an outgoing link or as little as an incoming channel to an outgoing channel. The latter is called channel switching.

The capacity of a path from any source node, through a core node, to any sink node can be dynamically modified. Network control (modification, or reconfiguration, of path capacity) is preferably exercised primarily at the edge nodes. That is, an edge node determines that a given path should be reconfigured, determines the nature of that reconfiguration and sends a configuration update to a core node in the given path. Accordingly, a simple network core structure is essential for realizing a high-capacity, high-performance network in which the core node connectivity can be adapted according to spatial traffic variation.

In an agile network, time coordination between the edge nodes and the core nodes is required to enable adaptive reconfiguration. That is to say, if an edge node determines that a given path should be reconfigured and indicates the required reconfiguration to a core node, time coordination (a) allows the core node to specify a time at which the reconfiguration will take place and (b) allows the respective edge nodes to react appropriately. Without time coordination, a large guard time, which can be of the order of several milliseconds, would be needed between successive configuration updates. A network having bufferless channel-switching core nodes and using a time-locking (time-coordination) technique is described in the applicant's U.S. patent application Ser. No. 09/286,431, filed on Apr. 6, 1999, and titled "Self-Configuring Distributed Switch", the contents of which are incorporated herein by reference. The connectivity of each core node is modified in response to traffic-load variations as reported to each core node controller by the edge nodes. To enable frequent reconfiguration without an excessive guard time, each edge node must be time-locked to each core node.

The number of sink nodes that a given source node can reach directly is referred to herein as the topological reach of the source node. Coarse switching, such as link switching or channel switching (described hereinafter), limits the topological reach of a source node and may necessitate tandem switching (described hereinafter) for data streams of low traffic intensity. A data stream is defined as data that is transferred from a source node to a sink node via a particular path (i.e., via a particular core node). A single fiber link may support numerous wavelength channels. Tandem switching may even be required with individual channel switching because the number of channels emanating from a source node would typically be smaller than the number of sink nodes addressable by the source node.

Tandem switching requires that a source node, wishing to send data to a destination sink node that is not reachable directly through a given core node to which the source node is connected, send the data, through the given core node, to an intermediate sink node. From the source node associated with the intermediate sink node, the destination sink node is reachable through the same or another core node.

A time-division-multiplexing-based bufferless-core network is described in the applicant's U.S. patent application Ser. No. 09/550,489, filed on Apr. 17, 2000, and titled "High-Capacity WDM-TDM Packet Switch", the contents of which are incorporated herein by reference. In a time division multiplexed (TDM) communications system, each channel is divided into time slots and the time slots are arranged in frames of a predetermined number of time slots. Each time slot is associated with a spatial attribute that corresponds to a destination. The use of TDM can significantly increase the topological reach and eliminate the need for tandem switching. The network may be frequently reconfigured by altering the spatial attributes of a subset of the time slots. Implementing TDM requires fast switching core nodes.

SUMMARY OF THE INVENTION

The networks described in the above patent applications confine a data stream to a single channel. In order to increase efficiency and accommodate data streams of very-high rates (exceeding 10 Gb/s, for example), it is desirable that a set of channels, forming a channel-band (wavelength band), be treated as a shared medium. It is also desirable that the network core be exempt from the task of isolating individual wavelength channels and providing a separate path for each wavelength channel.

In a network where multi-channel links connect the nodes, a core node has a capability to switch time slots in time division multiplexed frames of data that are spread across multiple wavelength channels. The network may be used to transfer heterogeneous data streams of widely varying bit rates over multi-channel links. In some cases, the bit rate of a data stream may substantially exceed the rate of a single channel. As the switching capability ideally uses time-locking between the core node and an edge node that is the source of the frames, methods are provided for initializing, maintaining and recovering this time-locking.

In accordance with an aspect of the present invention there is provided a method of switching data. The method includes receiving a multi-channel frame of data segments from a source node, where the frame is arranged such that a given time slot has a group of data segments, each from a different channel and all having the same destination; and switching the group toward the destination. In another aspect of the invention a core node is provided for performing this method.

In accordance with another aspect of the present invention there is provided a method for facilitating routing of wavelength division multiplexed (WDM) channels, each channel emanating from a core-interface output port. The method includes taking time slices of the WDM channels to form data segments, transmitting the data segments in time slots such that in one time slot, one data segment is transmitted from each core-interface output port and, prior to the transmitting, re-organizing data segments such that a plurality of data segments destined to one sink node is presented at a like plurality of the core-interface output ports so that the plurality of data segments destined to the one sink node is transmitted in one time slot. In another aspect of the invention an edge node is provided for performing this method.

In accordance with a further aspect of the present invention there is provided a method of facilitating, at an edge node that includes a time-counter, the alignment of arrival, at a core node, of corresponding data segments from a plurality of core-interface output ports of the edge node, where each of the plurality of core-interface output ports starts sending a set of data segments when a respective core-interface output port time-counter takes on a cyclic zero value, each respective core-interface output port time-counter taking on the cyclic zero value when the edge node time-counter takes on a core-interface output port specific start time, and where, the plurality of core-interface output ports collectively sends a timing message, comprising a locking data segment from each of the plurality of core-interface output ports, each locking data segment sent from a given one of plurality of the core-interface output ports when a corresponding core-interface output port time-counter takes on a first time value associated with the given one of plurality of the core-interface output ports. The method includes receiving a reply message from the core node, in response to the timing message, extracting, from the reply message, a second time value, for each core-interface output port, corresponding to a value on a time-counter at the core node when each locking data segment was received, determining, for each core-interface output port, an update to the core-interface output port-specific start time, based on a difference between the first time value and the second time value and instructing each of the plurality of core-interface output ports to adjust the cyclic zero value of the respective core-interface output port time-counter to occur at the update to the core-interface output port-specific start time. In another aspect of the invention an edge node is provided for performing this method.

In accordance with an even further aspect of the present invention there is provided a method of time-lock recovery at a core node in a composite-star network. The method includes instructing a switch to connect a link from a source node to a selector, instructing the selector to select input received from the switch, sending instructions to a sink node associated with the source node, the instructions including a request to send a timing message, continuously reading data received from the source node and if the timing message is received, replying to the timing message with timing information. In another aspect of the invention a space switch master controller is provided for performing this method. In a further aspect of the present invention, there is provided a core node that includes a master controller for performing this method. In a still further aspect of the present invention, there is provided a software medium that permits a general purpose computer to carry out this method.

In accordance with a still further aspect of the present invention there is provided a network. The network includes a plurality of source nodes, a plurality of outbound links communicatively coupled to the plurality of source nodes, a plurality of sink nodes and a plurality of inbound links communicatively coupled to the plurality of sink nodes. The network further includes a plurality of core nodes, each core node having a space switch, wherein at least a given one of the plurality of core nodes is communicatively coupled to a subset of the plurality of outbound links and a subset of the plurality of inbound links. The network further includes a plurality of master controllers, one master controller associated with each of the plurality of core nodes, each master controller for controlling a space switch in the associated core node. Each controller is operable to receive control data from at least one of the plurality of source nodes and generate a schedule for operation of a given one of the space switches based on the control data, the schedule associating each of a plurality of time slots, within a multi-channel time division multiplexed frame of data segments, with a destination. Each controller is further operable to communicate the schedule to at least one of the plurality of sink nodes and transmit instructions to a slave switch control unit for the space switch, where the instructions are based on the schedule.

In accordance with a still further aspect of the present invention there is provided a timing message transmitted from an edge node to a core node, carried in a link having a plurality of channels, the timing message carried in a plurality of locking data segments received at the core node, each of the plurality of locking data segments embodied in a distinct carrier wave corresponding to one of the plurality of channels. The timing message includes a first field containing timing data, where the timing data comprises an identity of an output port of the edge node and an indication of a reading of an output port time-counter.

In accordance with a still further aspect of the present invention there is provided a reply message carried in a link having a plurality of channels, the reply message carried in a plurality of data segments, each of the plurality of data segments embodied in a distinct carrier wave corresponding to one of the plurality of channels. The reply message includes a first field containing timing data, where the timing data comprises an identifier of an output port, an identifier of frame associated with the timing message and the time at which a timing message was received at a core node.

In accordance with another aspect of the present invention there is provided a method of facilitating, at an edge node that includes a time counter, the alignment of arrival at a core node of corresponding data segments from a plurality of core-interface output ports at the edge node, where each of the plurality of core-interface output ports starts sending a set of data segments when the edge node time-counter takes on a core-interface output port-specific start time. The plurality of core-interface output ports collectively sends a timing message comprising a locking data segment from each of the plurality of the core-interface output ports sent a predetermined length of time after the core-interface output port-specific start time, where the predetermined length of time is associated with the core-interface output port. The method includes receiving a reply message from the core node in response to the timing message and extracting, from the reply message, a time value, for each the core-interface output port, corresponding to a value on a time-counter at the core node when each locking data segment was received. The method further includes determining, for each core-interface output port, an update to the core-interface output port-specific start time, based on a difference between the predetermined length of time and the time value and instructing each of the plurality of core-interface output ports to start sending the set of data segments when the edge node time-counter takes on the update to the core-interface output port-specific start time.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate example embodiments of this invention.

DETAILED DESCRIPTION

Figure 1:
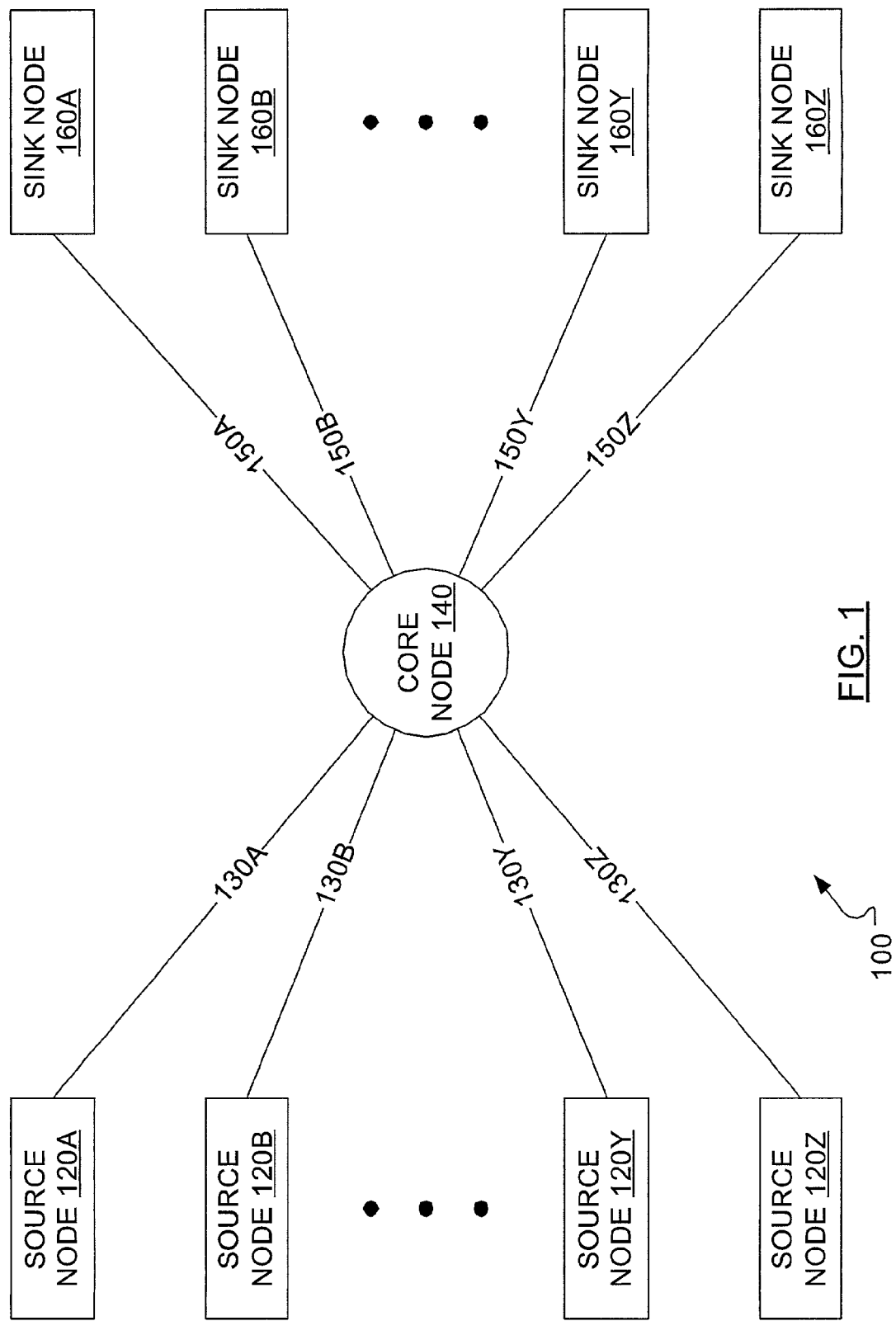
FIG. 1 illustrates a simple star network for use with an embodiment of the present invention.

FIG. 1 illustrates a simple star network 100 comprising a plurality of source nodes 120A, 120B, . . . , 120Y, 120Z (referred to collectively and individually as 120) and a plurality of sink nodes 160A, 160B, . . . , 160Y, 160Z (referred to collectively and individually as 160) interconnected by a high-capacity core node 140. Each of the source nodes 120 is connected to the core node 140 by a corresponding outbound link 130A, 130B, . . . , 130Y, 130Z (referred to collectively and individually as 130). Similarly, each of the sink nodes 160 is connected to the core node 140 by a corresponding inbound link 150A, 150B, . . . , 150Y, 150Z (referred to collectively and individually as 150). Each of the outbound links 130 and the inbound links 150 may carry multiple channels. The core node 140 may include optical switches, electronic switches, or combined optical-electronic switches. A given source node 120 and sink node 160 may be co-located in an edge node such that the source node 120 and the sink node 160 may share control. The multiple channels in the system of FIG. 1, indeed in the alternate systems described herein, originate as WDM channels, such that each channel has a different nominal wavelength.

The reliability of the entire network 100 is dependent upon the reliability of the core node 140. In addition, if the network 100 is to serve a wide geographical area, a propagation delay experienced by a data stream carried on one of the outbound links 130 from a source node 120 to the core node 140 can be unduly long, rendering the network inefficient and incurring unnecessary delay for a proportion of node pairs. The term "node pair" is used hereinafter to denote a source node in an edge node and a sink node in another edge node.

Figure 2:
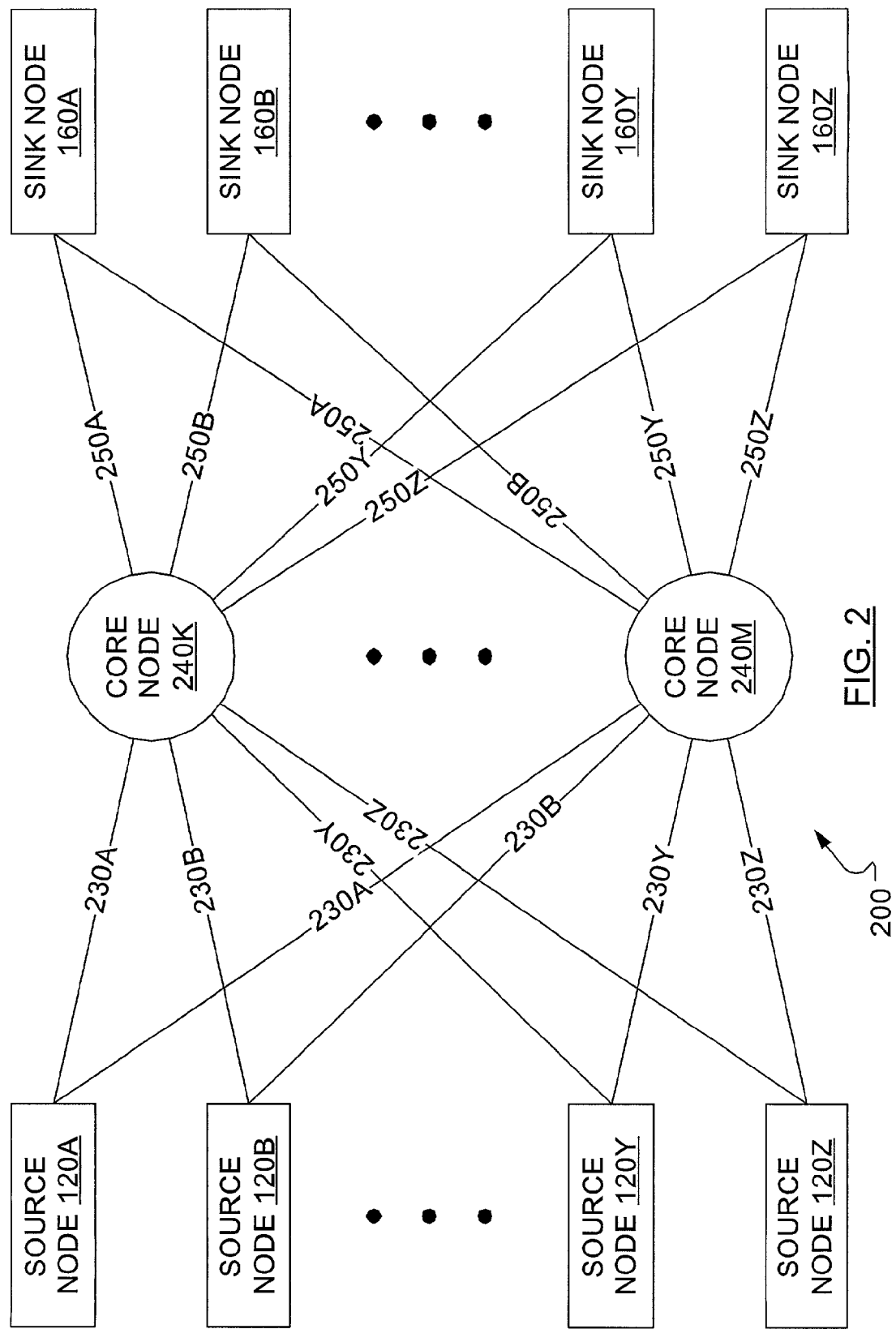
FIG. 2 illustrates a distributed switch network configured as a composite star network, for use with an embodiment of the present invention.

The inefficiency and unreliability of the network 100 can be remedied by distributing the switching function of the core node 140 among multiple core nodes 240K, . . . , 240M (referred to collectively and individually as 240) as shown in a distributed switch network 200 illustrated in FIG. 2. In such a distributed switch network 200, the multiple channels in each outbound link 130 may be divided into several outbound links 230 leading to the core nodes 240. Similarly, each inbound link 150 may be divided into several inbound links 250. A node pair may be connected through the one of the core nodes 240 that yields the least propagation delay and has a sufficient unassigned capacity.

In a complete network, the number of core nodes 240 should not exceed the maximum number of outbound links 230 originating at a source node 120 or the number of inbound links 250 terminating on a sink node 160. For instance, if a particular source node 120A can support eight outbound links 230, and that number of outbound links 230 is less than or equal to the number of links that emanate from any other source node 120 or terminate at any of the sink nodes 160, then no more than eight core nodes 240 would be employed. By definition, a complete network is one that can allocate paths of a total capacity of C (bits per second) from any set of ingress channels collectively having a capacity of C and emanating from any group of source nodes to any set of egress channels, collectively having a capacity that equals or exceeds C, and belonging to any group of sink nodes. For example, a source node can transfer its entire traffic to a sink node of at least equal capacity. Therefore, any spatial variation of traffic loads (i.e., distribution of traffic loads from source nodes to sink nodes) can be accommodated.

Figure 3:
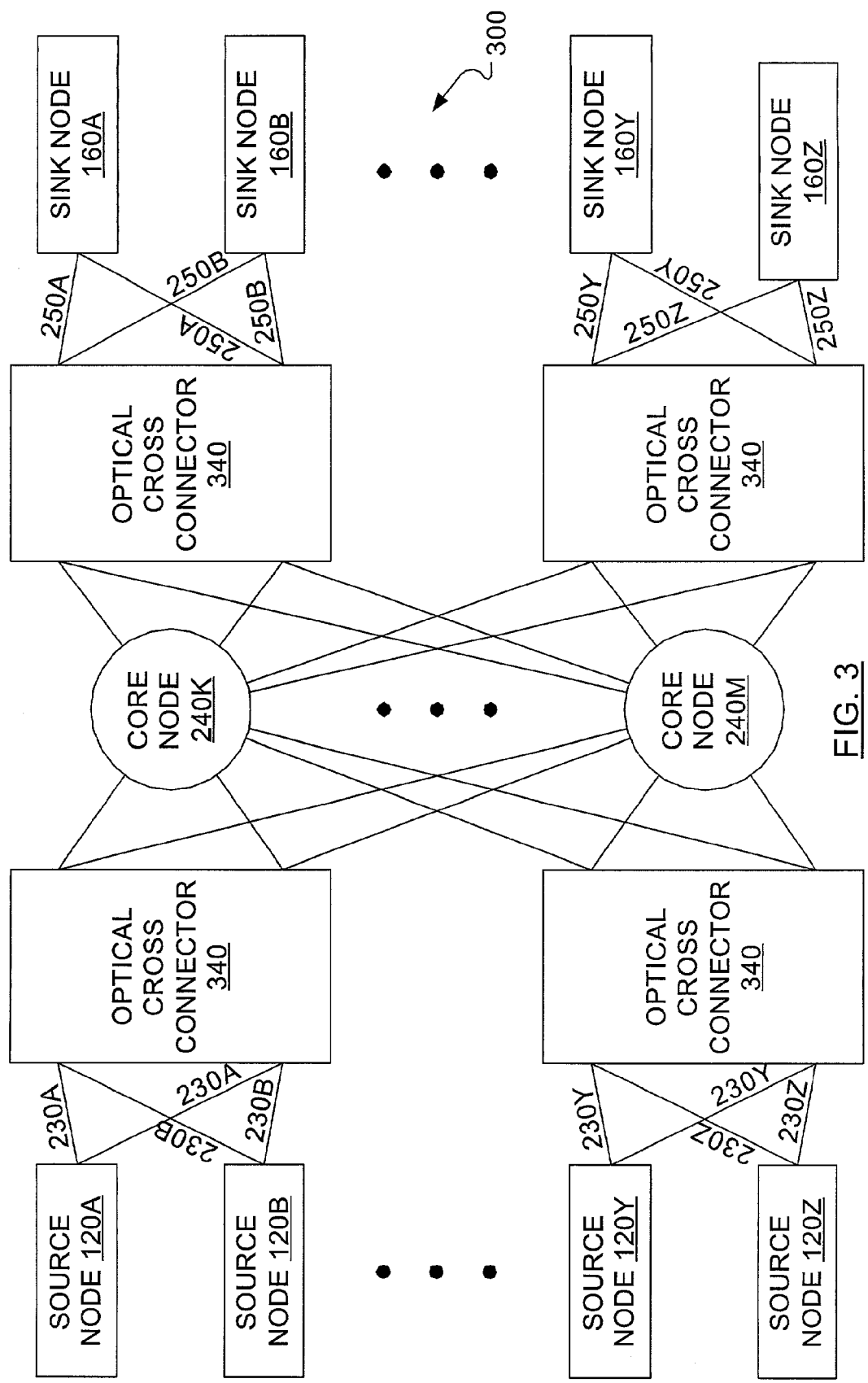
FIG. 3 illustrates an alternative distributed switch network configured as a composite star network where cross connectors are used to modify connectivity, for use with an embodiment of the present invention.

In an alternative distributed switch network 300 shown in FIG. 3, a set of optical cross connectors 340 is introduced on each side of the core nodes 240. The source nodes 120 and sink nodes 160 may then be grouped by association with one of these optical cross connectors 340. Channels in the outbound links 230 may be received by the optical cross connectors 340 and distributed to core nodes 240 in groups of channels called wavelength channel bands or, simply, channel-bands. Note that, despite the name, channel-bands need not necessarily comprise adjacent wavelength channels. A grouping of wavelength channels into a channel-band must be understood by each end of a link. The groups of channels are arranged by the optical cross connectors 340 such that a particular link is arranged into a group of channels based on the group of sink nodes 160 (and the associated optical cross connector 340) to which the channels in the group of channels are directed. Each optical cross connector 340 then sends each group of channels to an appropriate core node 240, specifically, the core node 240 that maintains a proximal connection to the optical cross connector 340 that corresponds to the grouping of the sink nodes 160 to which the group of channels is destined. The number of channels arranged into a particular group of channels, by an optical cross connector 340, is arbitrary. A path through the alternative distributed switch network 300 from a source node 120 to a sink node 160 may, therefore, comprise several channel-bands: a channel-band from a source node 120 to a first optical cross connector 340; a channel-band from the first optical cross connector 340 to a core node 240; a channel-band from the core node 240 to a second optical cross connector 340; and a channel-band from the second optical cross connector 340 to a sink node 160. Cross connectors 340 are virtually static, with infrequent change of connectivity. The introduction of the cross connectors 340 provides connection flexibility.

Figure 4:
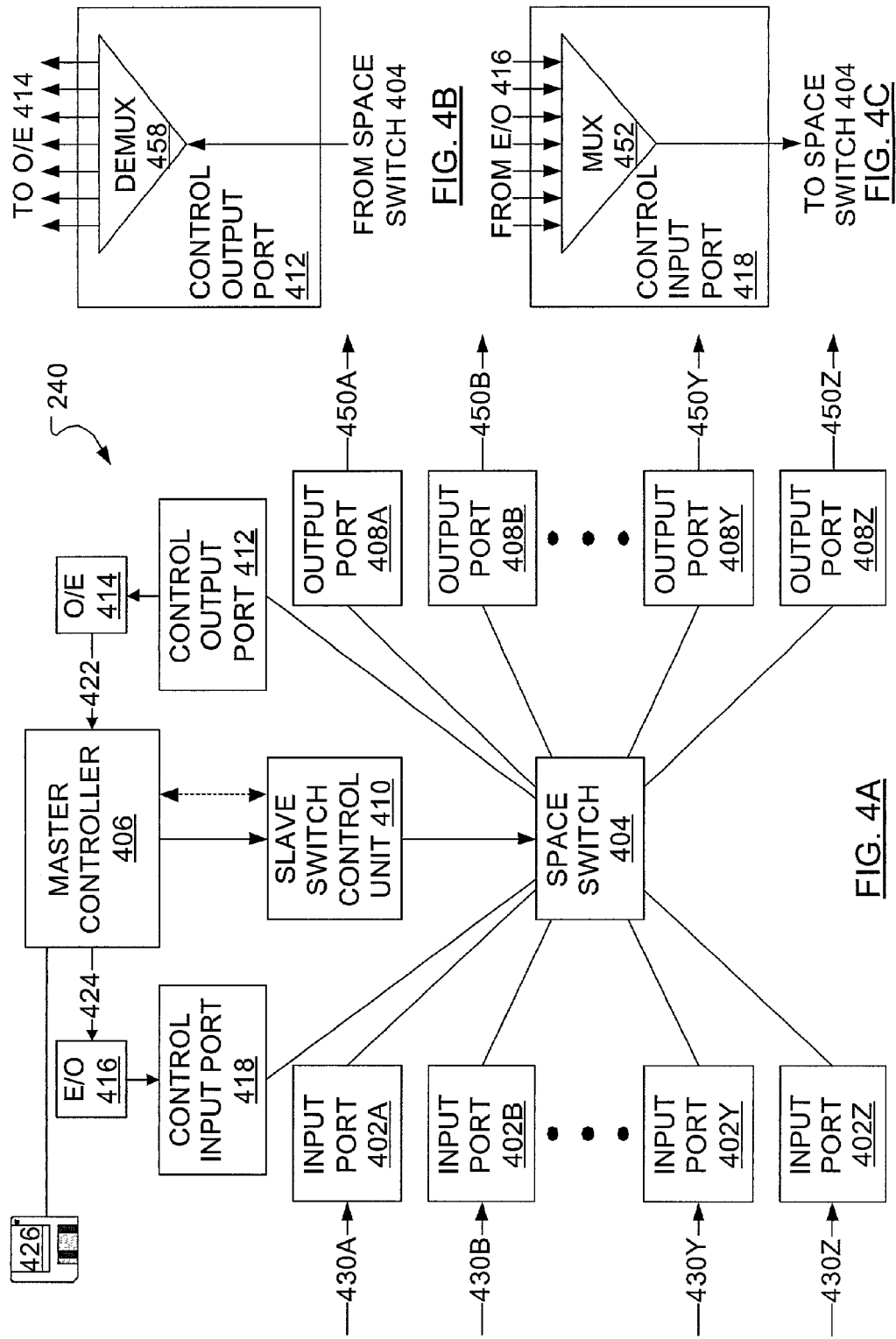
FIG. 4A illustrates a core node for use in the networks of FIGS. 1, 2 or 3 according to an embodiment of the present invention.
FIG. 4B illustrates a control output port for use in the core node of FIG. 4A according to an embodiment of the present invention.
FIG. 4C illustrates a control input port for use in the core node of FIG. 4A according to an embodiment of the present invention.

At the core node 240, illustrated in detail in FIG. 4A, a space switch 404 connects a plurality of input ports 402A, 402B, . . . , 402Y, 402Z (referred to individually or collectively as 402) to a plurality of output ports 408A, 408B, . . . , 408Y, 408Z (referred to individually or collectively as 408) under control of a slave switch control unit 410. The input ports 402 receive input on respective outbound links 430A, 430B, . . . , 430Y, 430Z (referred to individually or collectively as 430). Similarly, output ports 408 send output on respective inbound links 450A, 450B, . . . , 450Y, 450Z (referred to individually or collectively as 450). Each input port 402 is paired with an output port 408 and a paired input-output port connect to the same edge node. So that edge nodes may communicate with the core node 240, the space switch 404 may direct control data received from a given input port 402 to a master controller 406 via a control output port 412 and an optical to electrical (O/E) converter 414. Conversely, so that the core node 240 may communicate with edge nodes, the master controller 406 may send output to the space switch 404, via an electrical to optical (E/O) converter 416 and a control input port 418, whereat the output may be directed to a given output port 408 through the space switch 404. Based on communication from source nodes 120, the master controller 406 determines a connectivity pattern of input ports 402 to output ports 408 through the space switch 404 and communicates the connectivity pattern to the slave control unit 410.

The output of the control output port 412 is a WDM signal having W wavelengths. During a predetermined time slot, the WDM signal received at the control output port 412 carries control data from a single source node 120. To read the control data, the WDM signal is first demultiplexed at a demultiplexer 458, included in the control output port 412 (see FIG. 4B), into its W constituent wavelengths and the optical signal of each wavelength is processed by the O/E interface 414 to acquire the control data. The control data from all wavelengths is carried by a set of W electrical channels 422 which connect to an input interface 506 of the master controller 406 (see FIG. 5).

The output of the master controller 406 is placed onto a set of W electrical channels 424 which are each processed at the E/O interface 416 and the resulting optical signals of W wavelengths are then multiplexed by a multiplexer 452, included in the control input port 418 (see FIG. 4C), and switched to the appropriate sink node 160 through the space switch 404.

Each of the control functions of the master controller 406 can be implemented in application-specific hardware, which is the preferred implementation when high speed is a requirement. However, in an alternative implementation, the master controller 406 may be loaded with switching software for executing methods exemplary of this invention from a software medium 426 which could be a disk, a tape, a chip or a random access memory containing a file downloaded from a remote source.

Figure 5:
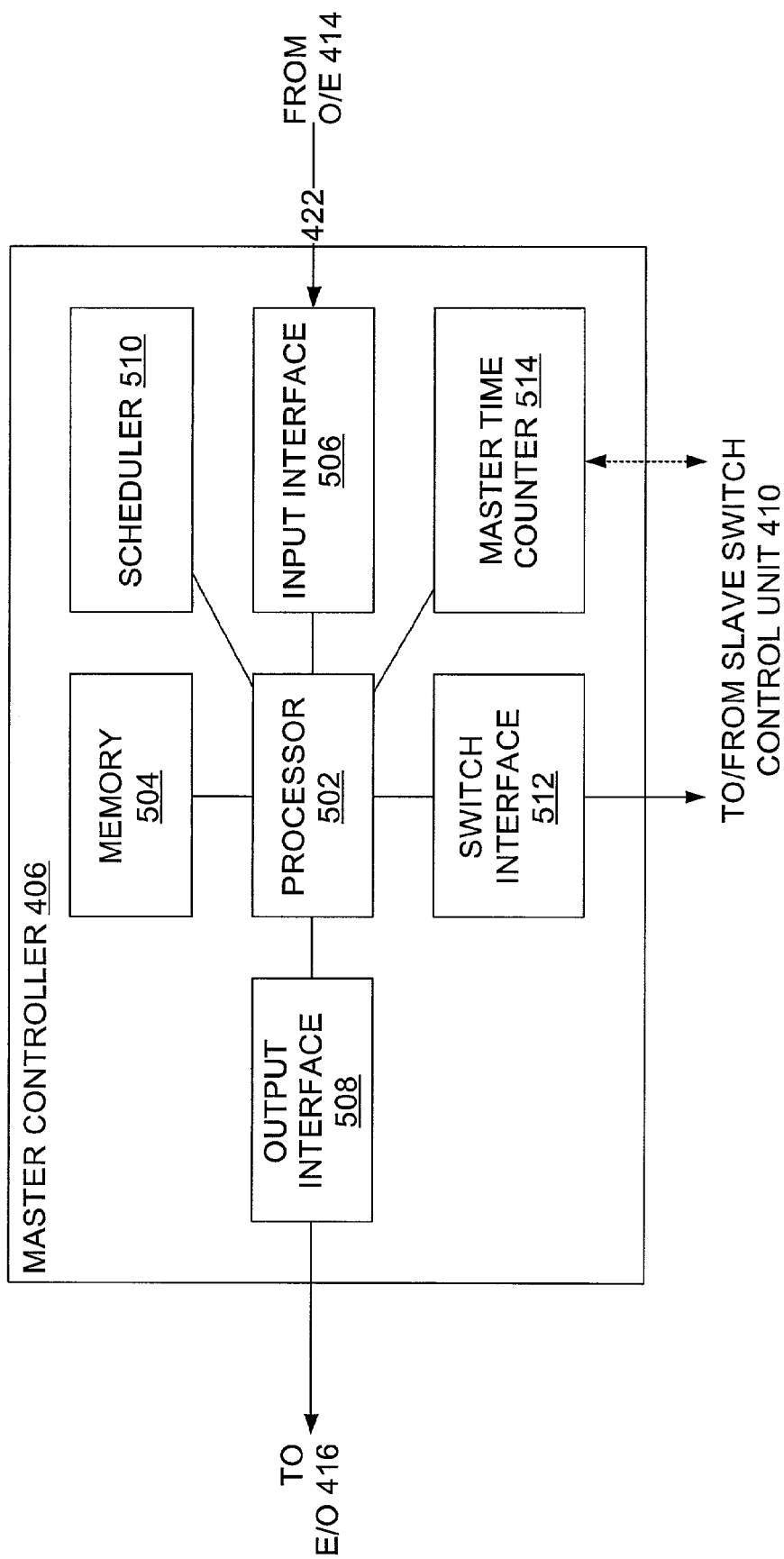
FIG. 5 illustrates a master controller for use in a core node as illustrated in FIG. 4A.

As illustrated in detail in FIG. 5, the master controller 406 includes a processor 502. The processor 502 maintains connections to a memory 504, the input interface 506, an output interface 508, a switch interface 512 and a master time-counter 514. At the input interface 506, the master controller 406 receives input from the source nodes 120 (perhaps via an optical cross connector 340, see FIG. 3). The input includes control data as well as conventional operational and maintenance data. Via the output interface 508, the master controller 406 may communicate with the sink nodes 160 to perform connection-control functions and conventional operational and maintenance functions. The processor 502 is also connected to a scheduler 510. Based on scheduling requests, which indicate a capacity allocation requirement (discussed hereinafter) and are received as control information from the source nodes 120 via the input interface 506 and the processor 502, the scheduler 510 may determine appropriate timing for switching at the space switch 404. According to the determined timing received from the scheduler 510, the processor 502 passes scheduling information to the slave switch control unit 410 via the switch interface 512. The processor 502 may also control the timing of transfer of data streams, from the source node 120 through the input ports 402 to the space switch 404, by transmitting scheduling information on the output interface 508. The data transferred from a source node 120 to a sink node 160 through a designated core node 240 is hereinafter called a data stream. The master time-counter 514 is a conventional counter counting up from a cyclic zero to a cyclic maximum before returning to the cyclic zero to count up again. The time taken to count from the cyclic zero to the cyclic maximum is called a master cycle (also a time-counter cycle, or master time-counter cycle). Notably, that which is herein termed "cyclic zero" need not correspond to a zero on the time-counter to which it relates. Cyclic zero is used to denote a start time of a given master cycle.

In overview, rather than restricting a stream of data to a single wavelength channel within a multi-channel link between a source node 120 and a core node 240, wavelength channels are organized, at the source node 120, into groups of wavelength channels called channel-bands. The channel-bands are used to carry a time division multiplexed (TDM) multi-channel frame of data from the source node 120 to the core node 240. However, to ease the management of switching the stream of data at the core node 240, simultaneous time slots in each channel-band may be arranged into "stripes" such that a particular stripe may only include data directed to a given sink node 160. At the core node 240, these stripes are switched in unison. Switching these stripes of data at the core node 240 requires that the source of such a stripe, say a source node 120A, indicate a capacity-allocation requirement to the core node 240 before sending the stripe. Based on the received capacity-allocation requirement, the scheduler 510 within the master controller 406 (FIG. 5) executes a scheduling algorithm, which determines the output port 408 to which each input port 402 connects during each time slot in the TDM frame.

In one rudimentary switching mode, the entirety of an outbound link 230 emanating from a particular source node 120 is switched at a core node 240 and directed to a particular sink node 160 on an inbound link 250. The particular sink node 160 to which each outbound link 230 is switched is prearranged through communication between the source node 120 and the core node 240. With this coarse switching granularity, data from a source node 120 can only reach a number of sink nodes 160 equal to the number of outbound links 230 emanating from the source node 120. The number of sink nodes 160 that a source node 120 can reach is, hereinafter, called the topological reach of the source node 120 in question. The topological reach of a node may also be called the "degree" of the node. It is noted that, in the configuration of FIG. 2, channel-bands within each multi-channel outbound link 230 are defined at the source nodes 120 while in the configuration of FIG. 3 channel-bands may be defined by the cross connectors 340. In either case, a channel-band is switched in unison.

In channel-band switching, it may be decided that an entire outbound link 230, comprising 50 channels for instance, is to be sent as a single entity to any sink node 160. This may be undesirable since the source node 120 may not need to send the volume of data possible with 50 channels to a single sink node 160. So, it may be decided that a band of only ten channels is to be sent to a selected sink node 160. This requires that an outbound link 230, arriving at the space switch 404, be divided into the individual channel-bands before being presented to the space switch 404. Using the example of a source node 120 having eight outbound links 230 each having 50 channels, each outbound link 230 has (50÷10=) five channel-bands, and the total number of channel-bands emanating from the source node 120 is 40 (eight outbound links 230 and five bands per outbound link 230). The topological reach of the source node 120 is now 40 where the topological reach of the same system wherein entire links are switched is eight. If the number of core nodes 240 is limited to eight, then each core node 240 may have five parallel space switches, one per channel-band.

In single channel switching, each channel of an outbound link 230 is switched, at a core node 240, to a channel on an inbound link 250. This also requires that an outbound link 230, arriving at a core node 240, be divided into the individual channels before being presented to the space switch 404. With 50 channels per link, this requires that the core node have 50 parallel space switches. Switching single channels through the core increases the topological reach of the exemplary eight-link 50-channel-per-link source node 120 to 400. In a network having more than 400 sink nodes 160, only 400 of the sink nodes 160 can be reached through the core node 240 that implements this switching mode.

If a core node 240 can switch quickly enough, Time Division Multiplexing (TDM) may be employed at the source node 120 in combination with WDM. Each source node 120 and sink node 160 requires a fast switching electronic fabric, as will be apparent in discussion of FIG. 9. In TDM switching, the data on each wavelength channel is organized into a TDM frame of a predefined number of time slots, each time slot having a predefined duration (for brevity hereinafter, the term "frame" will often be used to denote "TDM frame"). The TDM frame period is determined by the number of time slots in the frame multiplied by the duration of a single time slot. The space switch 404 in the core node 240 directs a data segment in each time slot to a predetermined destination. With single-channel switching, an outbound link 230 arriving at a space switch is divided into the individual channels before being presented to the space switch 404. Where the exemplary source node 120 has 400 channels connected to the core node 240, the data transmitted from the source node 120 can then be presented in 400 simultaneous single channel frames, each frame having, for example, 128 time slots. The total number of time slots from the source node 120 is then 51,200. The 51,200 time slots are independent, in the sense that each time slot can be routed independently, and the contents of each time slot can be directed as needed. The topological reach of such a source node 120, where the core node 240 uses single-channel TDM switching, can be 51,200. However, in a network where there are only 1024 sink nodes 160, for example, the topological reach of the source node 120 is the entire network. Since the number of time slots exceeds the number of sink nodes 160, flexible capacity allocation is feasible. For example, one sink node 160 may receive 5,000 time slots per frame period from the source node 120, through a number of channels, and another sink node 160 may only receive one time slot per frame period.

The core node 240 has an awareness of the destination of a switched data unit, whether the switched data unit is an entire link, a channel-band, a single channel or simply a data segment in a time slot. This awareness derives from information received from the source node 120 prior to receiving the switched data unit. Conceptually, while link switching, channel-band switching, single channel switching and TDM (time slot) switching in a core node 240 act on a carrier of information, only TDM switching has implicit awareness of the organization of the carried data.

Several schemes of data transfer from source nodes 120, or optical cross connectors 340, to core nodes 240 can be devised. Each data transfer scheme has a different degree of association with the above described switching modes of link, channel-band, channel or TDM (time slot) switching. Of course, after being switched at the core node 240, an identical data transfer scheme is used to transfer the data from core node 240 to sink node 160, or optical cross connector 340. Three data transfer schemes are illustrated in FIGS. 6 and 7.

Figure 6:
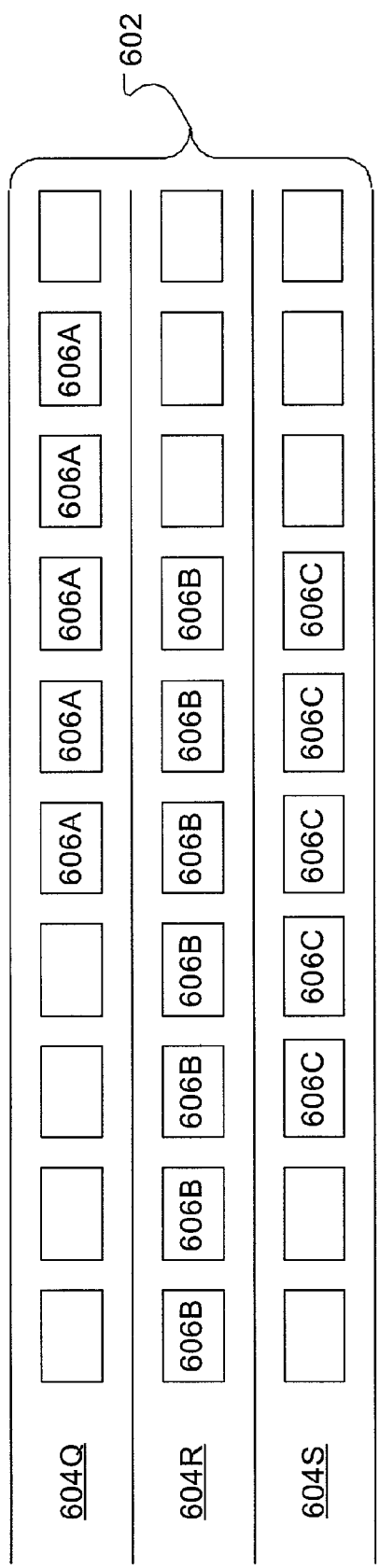
FIG. 6 illustrates a prior art distribution of data segments in a multi-channel link.
Figure 7:
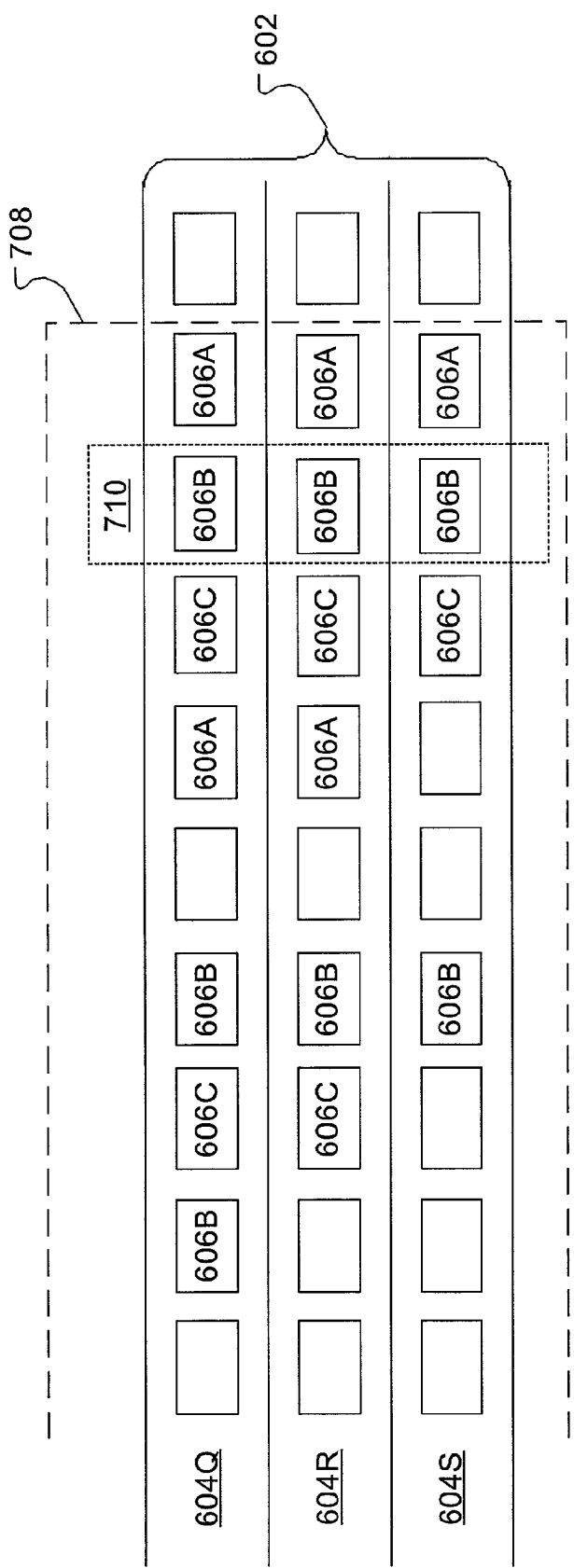
FIG. 7 illustrates an alternative distribution of data segments in a multi-channel link according to an embodiment of the present invention.

In a first data transfer scheme, illustrated in FIG. 6, a multi-channel link 602 is shown to include three channels 604Q, 604R, 604S (referred to collectively and individually as 604). Each of three data streams is represented by a series of data segments 606A, 606B, 606C (referenced collectively or individually as 606) and is shown to be confined to a single channel 604. The multi-channel link 602 carries the three individual data streams. Data segments 606 from a given stream are confined to a single channel 604 and would not be permitted to wander into other channels 604. This data transfer scheme is used in association with single channel switching, the switching granularity of such a data transfer scheme is the capacity of a single channel 604, typically having a capacity of the order of 10 Gb/s.

Switching granularity is a term for the minimum size of a switched data unit or minimum data rate that may be switched in a network. For example, the granularity of the voice network is 64 kilobits per second. Even if all that is required is to transfer data at two kilobits per second across the telephone network, the network still provides a connection capable of 64 kilobits per second. In a packet network, a minimum packet size may be imposed.

Normally, the multiple channels 604 emanating from a source node 120 would be directed towards several sink nodes 160. Thus, if the number of channels 604 from a source node 120 is 320, for example, a maximum of 320 sink nodes 160 can be reached by the source node 120 simultaneously. Such a switching granularity (per channel) can lead to low network efficiency, especially if the traffic distribution has a high variance. For example, if a given source node 120A wishes to send most of its traffic to a specific sink node 160A with a small, but non-zero, traffic load to each other sink node 160, the assignment of at least one channel 604 to each sink node 160 can be quite wasteful. The waste can be reduced either by using tandem switching or by creating a finer switching granularity through the use of TDM switching, described hereinafter.

If TDM switching is selected to reduce waste, and if each of the 320 channels 604 is organized into frames of 1,024 time slots, for example, where each time slot contains a single data segment 606, then the number of data segments 606 per time-frame period per source node 120 increases from 320 to become 327,680 with a data-rate unit of about 10 Mb/s.

At the space switch 404, a change in connectivity of an input port 402 to an output port 408 may be required as often as every time slot duration.

In a data transfer scheme illustrated in FIG. 7, TDM is used to divide the capacity of each outbound link 230 into frames. FIG. 7 identifies a frame 708 of data segments 606. The data segments 606 are arranged in the frame 708 such that data segments 606 that are part of the same data stream, or at least are destined for the same sink node 160, are "striped" (i.e., placed in the corresponding time slot) across the channels 604 of the multi-channel link 602. In other words, the switched data unit in FIG. 7 is a "parcel" 710 that is three channels tall, one time slot in duration and holds up to three data segments 606 all destined for the same sink node 160.

In review, a link can comprise many wavelength channels. A channel-band may be a subset of the channels in a given link or may include all of the channels in the given link. When a TDM frame is sent on a channel-band, a stripe is made up of a set of data segments, where each data segment is carried by a separate wavelength channel of a channel-band and all data segments are sent in the same time slot.

One embodiment of switching the data transfer scheme illustrated in FIG. 7 may be thought of as a variation of link switching as described above, wherein an entire outbound link 230 is switched toward a single sink node 160. However, in the incident embodiment, the outbound link 230 is only switched for the duration of a single time slot. Advantageously, a division of a given outbound link 230 into individual channels, for presentation to the space switch 404, is not required. A division of each outbound link 230 and each inbound link 250 into channel-bands (wavelength bands) increases the topological reach in comparison with link switching. A term, "maximum relative capacity waste", may be defined to describe the situation wherein the multi-channel frame carries data destined primarily for one sink node 160 and the time slots assigned to the rest of the sink nodes 160 are significantly underutilized. The maximum relative capacity waste for this scheme (of FIG. 7) is $(N-1)/(S \times L)$, where N is the number of sink nodes 160, S is the number of time slots per frame, and L is the number of outbound links 230. In general, the capacity requirement for each path, i.e., the required number of time slots per frame from a source node to a sink node, is expressed as an integer number (possibly zero) of time slots, plus a fraction of a time slot. If the fraction is uniformly distributed between 0.0 and 1.0, the mean value of capacity waste would be half the maximum capacity waste. Thus, the relative capacity waste in the exemplary case under consideration has a maximum value of $1/400$ and a mean value of $1/800$.

A multi-channel frame of 1,024 time slots, for example, can increase the topological reach by a factor of 1,024. The number of source nodes 120 or sink nodes 160 is limited by the number of ports in the core node 240. A reasonable limit of the number of ports per core node 240 is 1,024. Using 50-channel outbound links 230 and a 50-channel tall frame (analogous to the three channel tall frame 708) having 1,024 time slots, the number of switched data units per frame per source node 120 (or per sink node 160) is 8,192 (eight outbound links 230, each carrying 1,024 parcels) and the data-rate unit is about 500 Mb/s (50 channels×10 Gb/s channels divided by 1024 time slots). The maximum relative capacity waste corresponds to the maximum number of edge nodes (as mentioned earlier, an edge node comprises a source node 120 in association with a sink node 160) and the maximum relative capacity waste in the above example is about $1/8$ (from $(N-1)/(S \times L)$ where N=1,024, S=1,024 and L=8) and the mean value is about $1/16$.

In review, multiple data streams arrive at a source node 120. The data streams are partitioned into data segments, where each data segment has a duration of a single time slot. The duration of each time slot is defined along with the definition of the TDM frame that will carry the data segments. In one embodiment of the present invention, the frame is formed through striping of channel-bands. Data segments from each particular data stream may be assigned to time slots within the frame according to scheduling information received from the core node 240. In this way, a time slot has data segments destined for the same sink node on all, or a subset, of the channels that make up the outbound link.

The number of channel-band time slots per TDM frame 708 per source node 120 should substantially exceed the number of sink nodes 160. Thus, in another exemplary network having 1,024 edge nodes (each edge node including a source node 120 and a sink node 160) with each edge node connected to a core node 240 by a link having multiple channels, the number of time slots per TDM frame 708 should be high enough to contain the relative capacity waste below a reasonable bound. With 1,024 time slots per frame, 1024 edge nodes and eight outbound links (or channel-bands), the mean relative capacity waste would be $1/16$ and the maximum relative capacity waste would be $1/8$.

A guard time may be needed between successive time slots to account for time-alignment imperfection. The time slot duration must be considerably larger than the guard time between successive time slots to reduce the relative waste. However, unduly large time slots are likely to be underutilized for a large proportion of paths connecting source nodes 120 to sink nodes 160. This can result in a significant capacity waste due to the need to round up the actual number of time slots required, as described earlier. In summary, the time slot duration should be short enough to keep the frame duration below an acceptable limit. The frame duration should be long enough to accommodate a relatively large number of time slots and hence increase the topological reach of the edge nodes. Using a time slot duration of 200 nanoseconds, for example, the duration of a 10,000-slot frame is about 2.0 milliseconds, which may be considered excessive. Using the distributed core nodes 240, each core node 240 switching 1,024 channel-bands, the number of time slots per frame can be reduced to 1,024, yielding an acceptable frame duration of about 200 microseconds.

A short duration frame allows data streams more frequent access to the network and reduces the need to provision high capacity buffers at the source nodes. A frame length balance must therefore be struck. A data stream that is assigned only one time slot per frame in a long frame is required to wait an entire frame duration before gaining access to the network. A data stream may be arriving at the core node 240 at a steady rate of 10 Mb/s, for example, but may be transferred at a higher rate in large data blocks, confined to specific time slots, every frame duration.

In order that the parcels (see the parcel 710 in FIG. 7), which are within the frames that are received from the source nodes 120 at the core node 240, be switched to the appropriate sink node 160, timing is important. As illustrated in FIG. 5, the master controller 406 includes a master time-counter 514. Similarly, each edge node must have a time-counter and these edge-node time-counters should have the same period and clock rate as the master time-counter 514. These time-counters are used in a time-locking procedure performed between each edge node and the master controller 406. The time slots at the input ports of a core node 240 cannot be aligned without the time-locking procedure. One time-locking procedure is described briefly hereinafter and another is described in detail in the applicant's U.S. patent application Ser. No. 09/286,431, filed on Apr. 6, 1999, and entitled "Self-Configuring Distributed Switch", the contents of which are incorporated herein by reference.

The time-locking procedure is particularly necessary when using TDM frames such that switching data from a given input port 402 to a given output port 408 at the core node 240 occurs during the correct time slot. According to the result of a scheduling algorithm, the master controller 406 defines a master cycle with a starting point of time zero. Consider a scenario wherein a time-counter at a given source node 120 is locked to the master time-counter 514 (FIG. 5). If the source node 120 starts to send a data frame at time zero, the data frame will, because of a distance traveled by the data frame, arrive at the core node 240 some time after time zero as seen by the source node 120. Once the time-locking procedure has been applied, the time at which the data frame is transmitted by the source node 120 is adjusted such that the data frame sent from the source node 120 arrives precisely at a designated time with respect to the master time-counter 514, as will be detailed below. This time-locking function is required for each source node 120 regardless of its distance from the core node.

Figure 8:
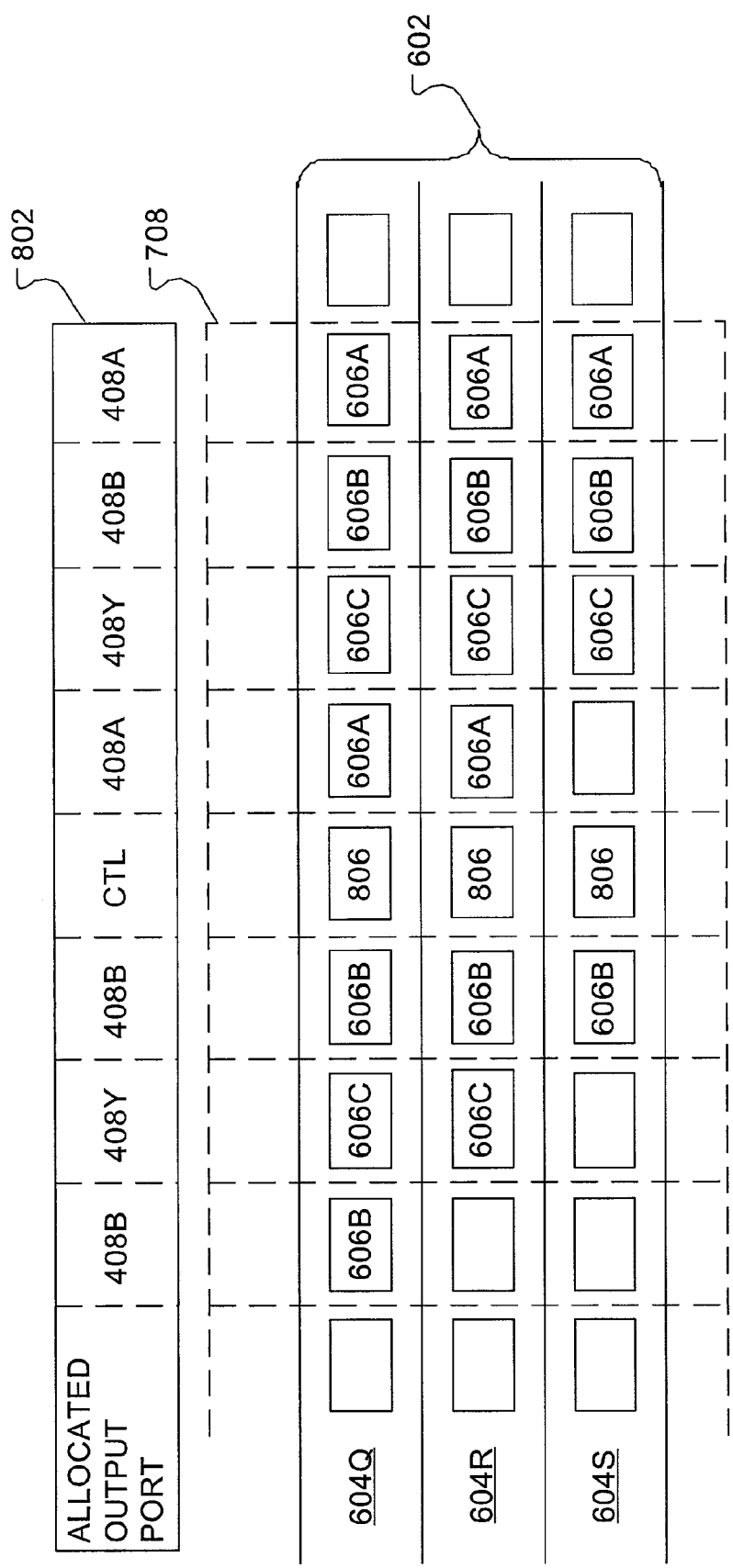
FIG. 8 illustrates the alternative distribution of data segments of FIG. 7 with additional detail, according to an embodiment of the present invention.

Consider FIG. 4A in view of the above striping technique (FIG. 7). Data is received from each outbound link 430 in the striped frame 708 having time slots of equal widths. The frame 708 of FIG. 7 is shown in FIG. 8 with the addition of time slot delimiters and an indication box 802 for apprising the reader of the output ports 408 to which the individual time slots are allocated. Each time slot is associated with an output port 408 and a given output port 408 may be assigned several time slots in the frame 708. Each striped frame 708 has at least one time slot called a control data time slot, identified in the indication box 802 of FIG. 8 as "CTL", that is dedicated to control segments 806 bound for the master controller 406. A typical core node 240 receives outbound links 230 carrying striped frames from multiple source nodes 120. As will be apparent to a person skilled in the art, the control data time slots in each of the striped frames arriving simultaneously at the input ports 402 should be staggered so that the master controller 406 may receive the content of each control data time slot one at a time.

The master controller 406 communicates with the sink nodes 160 during at least one time slot per frame. This communication does not require the aforementioned time-locking procedure. In general, up-stream communications (from the source node 120 to the core node 240) require time-locking while downstream communications (from the core node 240 to the sink node 160) do not require time-locking, but may be used, in a time-locking procedure, to communicate control data. Recall that each sink node 160 shares control with an associated source node 120, the source node 120 and sink node 160 thus forming an edge node.

The duration, T, of the striped frame 708 is set at any convenient value. However, the number, m, of time slots per frame preferably exceeds the number, n, of output ports 408 by at least one, to accommodate the control data time slot. With n=512, for example, selections may be made so that m is 1024 and the duration of each time slot is one microsecond. Given these conditions at a typical link data rate of 10 Gb/s, the frame duration, T, is about one millisecond and each time slot contains about 10,000 bits.

Figure 9:
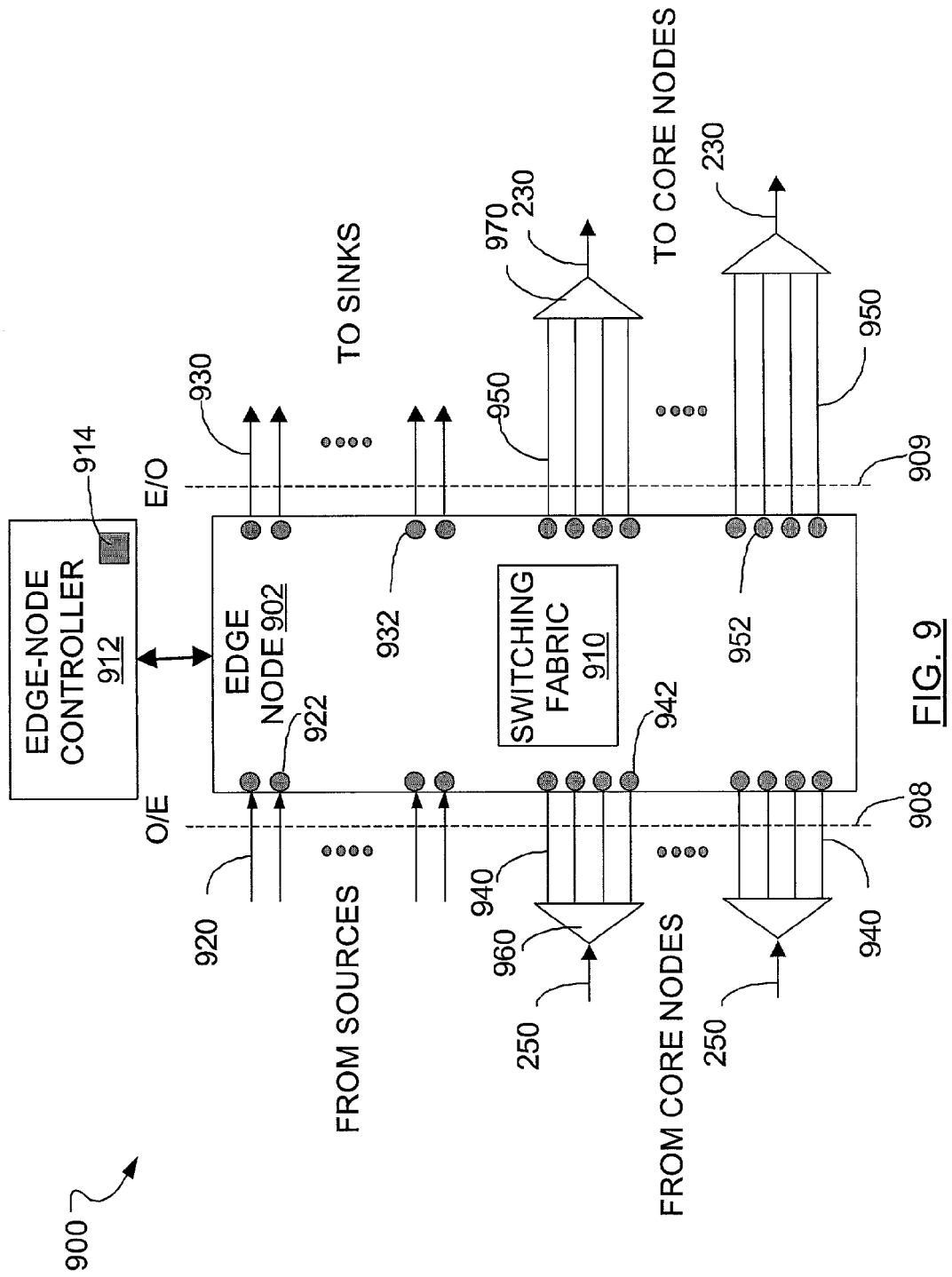
FIG. 9 illustrates an edge node for use in the networks of FIGS. 1, 2 or 3 according to an embodiment of the present invention.

FIG. 9 shows an edge node assembly 900 that includes an edge node 902, which combines the functions of a source node 120 and a sink node 160. The edge node 902 has a number, P1, of source-interface input ports 922 receiving data from subtending data sources (not illustrated), a number, Q1, of sink-interface output ports 932 delivering data to subtending data sinks (not illustrated), a number, P2, of core-interface input ports 942 receiving data from core nodes 240, and a number, Q2, of core-interface output ports 952 sending data to core nodes 240. The Q2 core-interface output ports are referenced collectively or individually as 952. The source-interface input ports 922 receive data via a number of incoming links 920. The sink-interface output ports 932 deliver data via any number of outgoing links 930. The inbound links 250 are demultiplexed by a demultiplexer 960 into a number of individual optical signals that are converted into electronic signals at an Optical/Electrical interface 908 and the electronic signals are submitted to the core-interface input ports 942 via a number of channels 940. The electronic output signals from the core-interface output ports 952 are converted into optical signals at an electronic/optical (E/O) interface 909 and the optical signals are submitted to a WDM multiplexer 970 which multiplexes wavelengths onto outbound links 230. The source-interface input ports 922 and core-interface input ports 942 connect to sink-interface output ports 932 and core-interface output ports 952 via a switching fabric 910. Each input or output port has a port controller (not illustrated).

The edge node 902 has an edge-node controller 912 that communicates with the source-interface input ports 922 and core-interface input ports 942 and with sink-interface output ports 932 and core-interface output ports 952. The edge-node controller 912 has a timing circuit which includes an edge-node time-counter 914 driven by a master clock (not illustrated). The wordlength of the edge-node time-counter 914 is preferably between 24 bits and 32 bits and the master-clock period is preferably between 10 nanoseconds and 100 nanoseconds. Selecting the wordlength of the edge-node time-counter 914 to be 24 bits, and with a master clock period of 20 nanoseconds, for example, would yield a master cycle duration (time-counter period) of about 330 milliseconds. For time-locking purposes, the master time-counter period should slightly exceed the round-trip propagation delay for the widest separation between a core node and an edge node.

The individual channels in a multi-channel TDM link travel at slightly different speeds in a fiber link resulting in signal dispersion that increases with distance. While dispersion within a modulated single channel can be reduced by well known techniques, dispersion as viewed across a wide wavelength band generally remains pronounced on a link. In the channel-band TDM switching technique according to the present invention, multi-channel signals to be switched during a time slot at a core node must be precisely aligned because the core nodes are bufferless.

Figure 10:
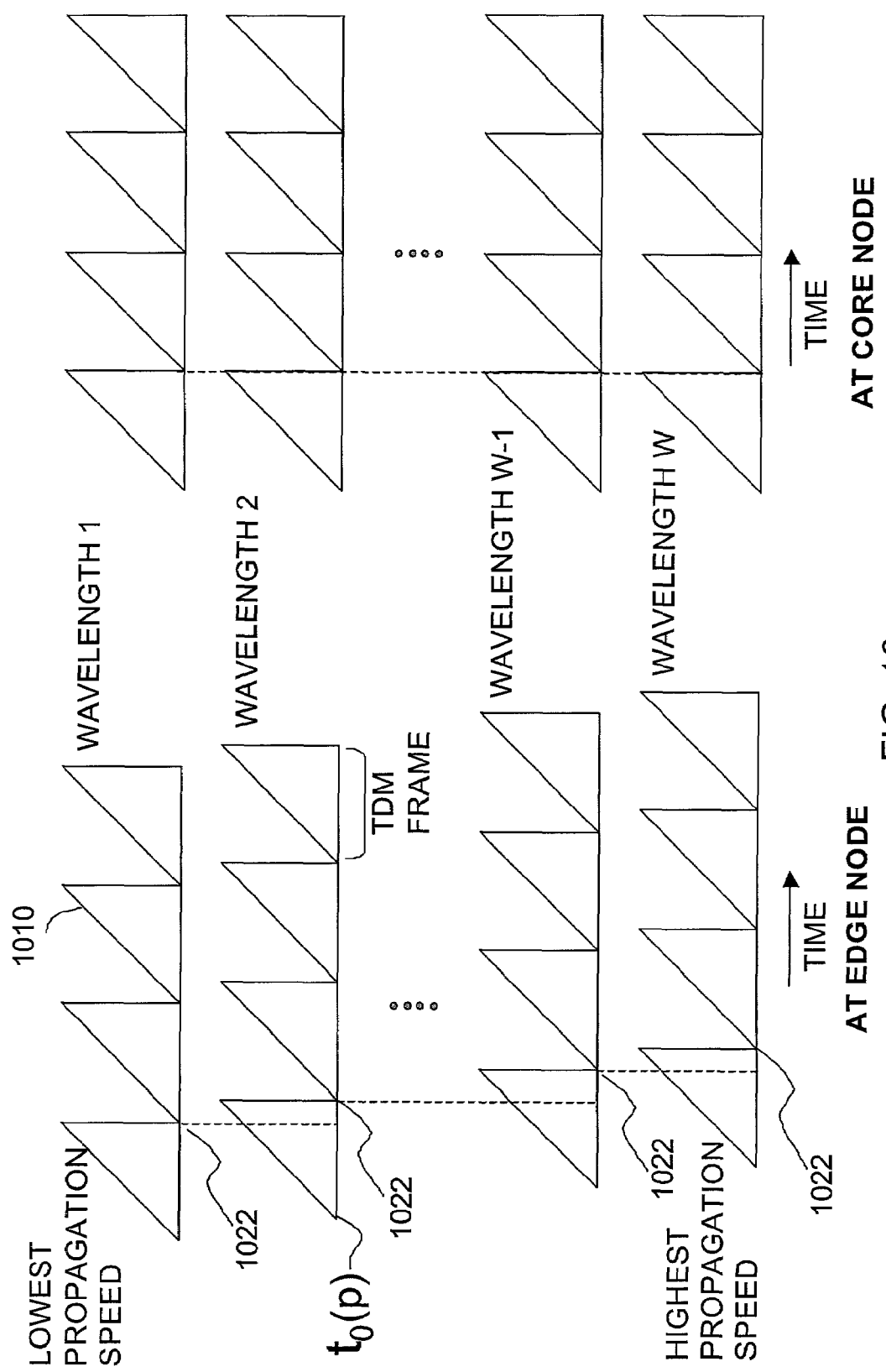
FIG. 10 illustrates timing offset of TDM frames leaving edge node ports and subsequently arriving at core node ports.

In order to ensure that data segments 606 (FIGS. 7, 8) of the same data stream, which are carried on a channel-band, arrive at the bufferless core node simultaneously, the data segments 606 may have to leave their respective edge node 902 at offset (staggered) instants of time, as illustrated in FIG. 10. Each triangle shape 1010, representing a time slot number vs. absolute time, is used to represent a single channel portion of a TDM frame on a particular one of W wavelength channels and a reference numeral 1022 is used to identify the starting time of corresponding single channel portions 1010. A succession of four single channel portions 1010 is shown in FIG. 10 as sent from each of W core-interface output ports 952. If the staggering of the starting times 1022 of the single channel portions 1010 is performed correctly, the single channel portions of all W wavelength channels are aligned as the single channel portions arrive at the core node 240. This ideal situation is illustrated on the right-hand side of FIG. 10.

In a long-haul path, the largest propagation delay difference in a wavelength band in a fiber link may be significant; several microseconds for example. If the propagation delay differentials of W wavelength channels are predictable, then the time-locking function mentioned above can be applied to one wavelength channel only and the source node 120 can then adjust the relative transmission times for the other (W−1) data segments of each time slot. A more reliable method is to apply time-locking to each wavelength channel in a channel-band. Timing data from each output port of the source node 120 may be sent to a core node as part of a control data time slot. For W wavelength channels in a switched channel-band, W time-counter readings may be transmitted to a selected core node to effect time-locking per channel. The single channel portions at the output ports of the source nodes are staggered accordingly so that the W single channel portions arrive at the core node 240 in alignment. It is noted that the W single channel portions need not be aligned when they reach the destination sink node 160 since each sink node has data buffers.

The specific control data time slot that carries timing data, perhaps alongside other control data, is hereinafter called locking time slot and the TDM frame that includes the locking time slot is called the locking TDM frame. Similarly, a control segment in a locking time slot is called a locking segment.

The above measures taken to offset the effect of propagation-speed differences may not be needed in a network where the highest propagation delay from an edge node to a core node is relatively small, of the order of one millisecond for example. The dispersion effect would then require a relatively small guard time between successive time slots in the TDM frame.

To determine the staggered departure times, a time-locking mechanism is used, which is similar to a mechanism described in the applicant's U.S. patent application Ser. No. 09/286,431, filed on Apr. 6, 1999, and entitled "Self-Configuring Distributed Switch", the contents of which are incorporated herein by reference. The technique described in U.S. application Ser. No. 09/286,431 applies to channel switching. In the present application, the technique is adapted to TDM. In the time-locking method according to the present invention, the edge-node controller 912 maintains an edge-node time-counter 914. The controller 912 maintains an array $t_0$ and an array $t_1$ each having Q2 elements, where Q2 is the number of core-interface output ports 952 interfacing with the core nodes 240, as defined earlier. An element that corresponds to a port p, where $0 \leq p < Q2$, is referenced as the $p^{th}$ element.

It may be considered that each core-interface output port 952 maintains a corresponding output port time-counter (not shown), which is phase locked to the edge-node time-counter 914. The beginning of each master cycle at the different output port time-counters must be selected so that when a timing message is sent at a length of time $t_1(p)$ after a cyclic zero on an output port time-counter at a core-interface output port 952 labeled p, the timing message arrives at the respective core node at a time where the reading of the master time-counter 514, of the core node master controller 406 (see FIG. 5), is exactly equal to $t_1(p)$. To realize this condition, the beginning of each master cycle of each output port time-counter must be adjusted based on timing data exchange between the edge node and the core node. The starting time of the master cycle of each output port time-counter is denoted $t_0(p)$, p=1, 2, . . . , 192 (with Q2=192). Initially, each entry in $t_0(p)$, p=1, 2, . . . , 192, may be selected to be zero, i.e., the master cycle of each core-interface output port 952 time-counter is set to be aligned with the master cycle of the edge-node time-counter 914.

Each value $t_1(p)$ may correspond to a reading on the core-interface output port 952 time-counter at the start of a locking data segment in the single channel portion of the locking TDM frame that is supplied by the $p^{th}$ core-interface output port 952. Alternatively, where each core-interface output port 952 does not have a time-counter, the value $t_1(p)$ may correspond to a predetermined length of time after the cyclic zero time, where the predetermined length of time corresponds to the $p^{th}$ core-interface output port 952. The values in array to are properly selected so that the TDM frames of all channels in an outbound link 230 are aligned when the frames arrive at the core node 240 at which the outbound link 230 terminates.

A timing message is sent over a link to a respective core node 240 in a locking time slot. The timing message includes an indication of $t_1(p)$ for each core-interface output port 952 connected to the link. The core node master controller responds with a reply message that includes an indication of the value $t_2(p)$ corresponding to a reading of the master time-counter 514 at which the locking data segment, for the $p^{th}$ core-interface output port 952 connected to the link, was received. When time-locking is achieved, each value $t_2(p)$ should equal each value $t_1(p)$ for equivalent p, $0 \leq p < Q2$, as will be explained below with reference to FIG. 11. The values $t_0(p)$ for each core-interface output port 952 that belongs to a single channel-band directed to a single core node 240 and carrying data of a single data stream must be adjusted so that the TDM frames on the individual wavelengths of the wavelength band are in precise alignment upon arrival at the respective bufferless core node.

The control data time slots are selected by core nodes 240 so that control data time slots in the TDM frames arriving on different outbound links 230 do not coincide. This allows a single control input port 418 and a single control output port 412 in a core node 240 to exchange timing and scheduling information with the edge nodes 902, as will be described later with reference to FIG. 11. Exchanging data between the edge nodes 902 and a core node 240 during specific time slots can only be realized when all outbound links terminating on a core node 240 are time-locked to the master time-counter 514 of the master controller 406. Before time locking, the exchange of time locking information occurs in the absence of data traffic and may happen at any time during a frame. As will be discussed hereinafter, the respective controllers at the edge node and the core node recognize incoming timing information by the structure of the message.

The value $t_1(p)$ that is included in a timing message, from a core-interface output port 952 labeled p, has B bits, B being the width (wordlength) of the output port time-counter, which is the same as the width of the edge node time-counter 914. The duration, H, of a master cycle of the edge-node time-counter 914 must be an integer multiple of the duration, T, of the TDM frame, i.e., the ratio G=H/T must be an integer, G being the number of TDM frames per time-counter master cycle. Both T and H are measured in terms of a number of clock periods and both are preferably selected to be powers of two. For example, if B=24 bits, the most significant eight bits may be used as a TDM frame identifier, and the least significant 16 bits indicate the relative time within a TDM frame.

Selecting either T or H to be an integer other than a power of two would slightly complicate the time-counting process. In general, the B bits are divided into two parts b1 and b2. The first b1 bits identify a TDM frame relative to a time-counter cycle (master cycle) and the following b2 bits indicate the time, measured in clock periods relative to the start of a TDM frame. A clock period is the interval between two successive clock pulses. A typical clock period is 20 nanoseconds.

The number, G, of TDM frames per time-counter cycle is preferably $2^{b1}$. However, an arbitrary value not exceeding $2^{b1}$ may be used. For example, if b1=8, then G may be selected to be any positive value less than or equal to 256. Similarly, the period T of a TDM frame is preferably $2^{b2}$. However, any value that does not exceed $2^{b2}$ may be used. If b2=16, for example, then any positive value less than 65536 may be used. The TDM frame has S time slots, and the duration, D, of a time slot is $2^{b2}/S$, expressed in terms of clock periods. With b2=16, and S=1024, for example, then D=64, and with a clock period of 20 nanoseconds, a time slot width is 1.28 microseconds.

In the above example, with one locking time slot in a locking TDM frame, the control time slots of the other 255 TDM frames within each master cycle can be used to carry other maintenance and management data.

Figure 11:
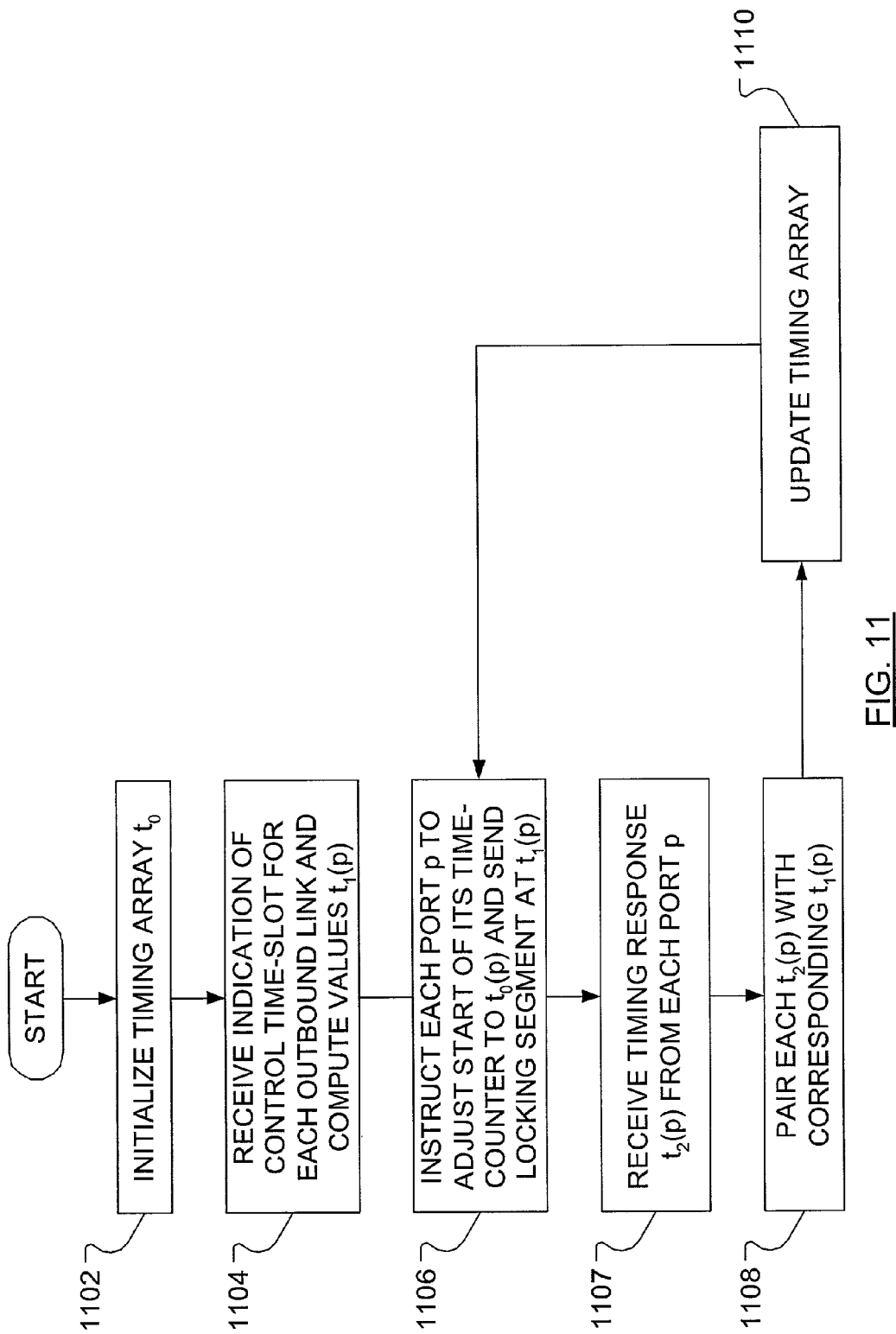
FIG. 11 illustrates steps in a method of time-locking a time-counter in an edge node to a time-counter in a bufferless core node according to an embodiment of the present invention.

To align all the TDM frames at all core-interface output ports 952 in an edge node 902, a time-lock-loop as illustrated in FIG. 11 is used. The value of an entry in array $t_0$ varies between 0 and N1×N2−1, where $N1 \leq 2^{b1}$ (N1 being the number of TDM frames encompassed by a master cycle) and $N2 \leq 2^{b2}$ (N2 being the number of time slots in a TDM frame). For b1=8 and b2=16, for example, with N1=200 (less than $2^8$) and N2=50,000 (less than $2^{16}$), then $0 \leq t_0(p) < H$, $0 \leq p < Q2$, H=N1×N2=10,000,000 being the time-counter duration expressed in terms of clock periods. The value of an entry in array $t_1$ also lies in the same range as the values of entries in array $t_0$. The required values of entries in array $t_1$ are derived from information received from a respective core node master controller 406. A given edge node 902 may connect to several core nodes 240 via outbound links 230 and inbound links 250 and the given edge node 902 receives, from each core node to which it is connected, the identity (number) of a time slot in the TDM frame that the respective core node has reserved for receiving control data through the respective outbound link 230. A control data time slot is also reserved on each inbound link 250. Preferably, the control data time slots on a paired outbound link 230 and inbound link 250 (i.e., the links that connect a particular edge node to a particular core node) are identical. The control data time slots are determined at installation time or when new outbound links 230 are introduced. The control-time slots selection can be updated by a master controller 406 at a core node 240. The updates would then be communicated to respective edge nodes. Changing a control data time slot requires initiation of a time-locking procedure, as will be explained with reference to FIG. 15.

For each outbound link 230, a time-locking procedure may be exercised one at a time for each wavelength channel, i.e., for each core-interface output port 952 connecting to a channel 950 of the outbound link 230. However, if desired, all outbound links 230 can implement the time-locking procedure simultaneously. The edge-node controller of a given edge node sends a timing message to the master controller of the particular core node with which the given edge node seeks time-locking. The timing message relates to one or more of the core-interface output ports 952 that supply channels that are multiplexed and sent to the particular core node. The locking data segment from the $p^{th}$ core-interface output port 952 may be sent when the output port time-counter takes on the value $t_1(p)$. A reply message, sent to the edge-node controller 912 from the master controller 406, indicates, for each locking data segment, that the locking data segment was received at the master controller 406 when the master time-counter 514 had the value $t_2(p)$. The edge-node controller 912 then modifies its current value of $t_0(p)$ to $[t_0(p)+t_1(p)-t_2(p)+H]$ modulo H. Note that $t_0(p)$ is initialized as zero.

Data conveyed during each time slot in an outbound link 230 is switched to target inbound links 250 as determined by a switching-time schedule computed by the scheduler 510 of the master controller 406. The switching-time schedule indicates a destination sink node for each time slot in the TDM frame of each outbound link 230. The scheduling algorithm is not described in this disclosure. When all outbound links 230 terminating on a core node 240 are time-locked, i.e., when each channel in each outbound link 230 is time-locked to the core node 240, the core node 240 is ready to start TDM switching.

The time-locking process is a continuous process as indicated by the loop of FIG. 11. To begin, the edge-node controller 912 initializes the timing array $t_0$ (step 1102) for each p, $0 \leq p < Q2$. The edge-node controller 912 subsequently receives an indication from a core node 240 of the particular time slot to use as a locking time slot for a given outbound link 230 and computes a timing message value $t_1(p)$ for each of p core-interface output ports 952 (step 1104). The edge-node controller 912 instructs each of p core-interface output ports 952 to start its respective output port time-counter when the edge node time-counter 914 takes on the value $t_0(p)$ (step 1106). The edge-node controller 912 also indicates the value $t_1(p)$ to each output port. A timing message, an exemplary format of which follows hereinafter, is sent in a control data time slot known as the locking time slot, which is made up of a locking data segment sent by each core-interface output port 952. Each core-interface output port 952 may send its locking data segment at a time $t_1(p)$ on the respective output port time-counter. The edge-node controller 912 subsequently receives a reply message (step 1107). The reply message includes a time $t_2(p)$ indicated on the master time-counter 514 at which the $p^{th}$ locking data segment was received. At the edge-node controller 912, the value $t_2(p)$, at which the timing message was received, is paired with a corresponding timing message value $t_1(p)$ (step 1108). These paired values are used to update the timing array $t_0$ (step 1110) such that $$t_0(p) \leftarrow [t_0(p)+t_1(p)-t_2(p)+H] \text{ modulo } H.$$

The updated timing array $t_0$ is then used in step 1106. Steps 1106, 1107, 1108 and 1110 are repeated even after $t_1(p)=t_2(p)$ for each p, which is the goal, such that a "steady-state" time-locking may be maintained. As soon as $t_1(p)=t_2(p)$, an output port is time locked to a respective core node and can be used to send data.

Consider a network having eight core nodes labeled CN1 to CN8, and 127 edge nodes, labeled EN1 to EN127. Referencing FIG. 9, each edge node is connected to each core node by a multi-channel link carrying 24 wavelengths and has Q2=192 core-interface output ports 952. Furthermore, each edge node exchanges timing data with each core node. Exchange of control data (including timing data) between an edge node 902 and a core node 240 is handled by the respective edge-node controller 912 and master controller 406. Each core-interface input port 942 and core-interface output port 952 of an edge node 902 has its own port controller (not shown) that communicates internally with the edge-node controller 912 of the edge node 900. The internal communications lines are not illustrated in FIG. 9.

The time-counters at the edge nodes and core nodes should have the same wordlength; 24 bits for example. Furthermore, clocks present at the edge nodes and core nodes should be phase locked. The interval between successive clock ticks may be 20 nanoseconds, for example. Thus, a master cycle has $2^{24}=16,777,216$ tick duration and a time duration of about 335 milliseconds. Of the 24 bits defining the master cycle, eight bits may be used to identify a TDM frame within a master cycle and the remaining 16 bits may be used to indicate a time (tick number) within the identified TDM frame. Thus, where the number of TDM frames in the exemplary master cycle is $2^8=256$, and the number of clock ticks per exemplary TDM frame is $2^{16}=65,536$, the duration of a TDM frame is about 1.3 milliseconds. The number of time slots per TDM frame is arbitrarily selected to be $2^9=512$, and each time slot has $2^{16-9}=2^7=128$ clock ticks and, hence, a time duration of 2.56 microseconds. The 512 time slots within each TDM frame may be labeled as 0, 1, . . . 511, and start at clock ticks 0, 128, . . . , 65408 with respect to the start of the respective TDM frame.

The $200^{th}$ time slot, for example, starts at clock tick $200 \times 128=25,600$ measured from the beginning of a TDM frame.

Consider the exchange of timing data between an edge node EN92 and a core node CN2. Further consider that core node CN2 has 127 input ports, from the 127 edge nodes, and 127 output ports, leading to the 127 edge nodes, and that core node CN2 receives an optical signal at each of its 127 input ports. Each optical signal carries data formatted in TDM frame having 512 time slots. The master controller 406 of core node CN2 allocates at least one time slot per TDM frame to receive control data from each of the edge nodes. The control data time slots are spread along the time required to receive each TDM frame at the core node so that the master controller receives the control signals from the edge nodes EN1 to EN127 at different time slots in each TDM frame. It is noted that, for each optical signal received at an input port, only one time slot in a selected TDM frame during each time-counter cycle carries timing data.

The edge-node time-counter 914 in edge node EN92 may be read by all core-interface output ports 952 through an internal bus or some other means. The (Q2=) 192 core-interface output ports 952 may be divided into eight groups, labeled group-1 to group-8, each group having 24 output ports. As well, the core-interface output ports 952 may be arbitrarily labeled. For example, output ports 1 to 24, inclusive, may be labeled as belonging to group-1, output ports 25 to 48, inclusive, may be labeled as belonging to group-2, and so on.

The electronic signal at each core-interface output port 952 modulates a wavelength channel. Different wavelength channels are used within each of the above eight groups and the resulting 24 modulated wavelength channels within a group are multiplexed, by the WDM multiplexer 970, onto an outbound link 230 leading to one of the core nodes named CN1 to CN8. Thus, there are eight outbound links labeled L1, L2, . . . , L8 which, respectively, connect edge node EN92 to core nodes CN1, CN2, . . . , CN8. Outbound link L1 carries the wavelength channel multiplexed signals from the group of output ports labeled group-1, L2 carries the wavelength channel multiplexed signals from the group of output ports labeled group-2, and so on.

Edge node EN92 uses outbound link L2 to connect to core node CN2. Outbound link L2 carries data from the core-interface output ports 952 labeled 25, 26, . . . , 48. Consider that core node CN2 has decided to allocate the $200^{th}$ time slot in each TDM frame for receiving control data from edge node EN92. While core node CN2 allocates a control time slot to each of its 127 input ports, core node CN2 does not select a particular one of the 256 TDM frames in a master cycle as a locking TDM frame. The locking TDM frame is selected by the edge node. The TDM frames within a master cycle may be numbered as 0, 1, . . . , 255. If edge node EN92 selects the $5^{th}$ TDM frame to be the locking TDM frame and, as discussed, core node CN2 selects the $200^{th}$ time slot to be the control time slot, then the locking time slot starts at a clock tick number determined by the following calculation: $5 \times 2^{16}+(200 \times 128)=353,280$. The edge-node controller 912 then fills entries 25 to 48 in array $t_1$ so that:

$$t_1(25)=t_1(26)= \ldots =t_1(47)=353,280.$$

The time is measured in clock ticks and the reference point is the start of a master cycle at respective core-interface output ports 952. Note that the master cycle has $2^{24}=16,777,216$ clock ticks.

Similarly, edge node EN92 selects a locking TDM frame for each of its remaining outbound links L1, L3, L4, L5, L6, L7 and L8 and receives indications from the core nodes of respective arrival time slots. Edge node EN92 can then finish computing all 192 entries in array $t_1$. The locking TDM frames selected by each edge node 902 need not follow any specific pattern. However, it is preferable that they be equally spaced within the master cycle. Array $t_1$ is virtually static, it may be extended to add new outbound links. Otherwise, the content of array $t_1$ need not be modified.

Each core-interface output port 952 sends its locking data segment to a respective core node at the time indicated by the corresponding entry in array $t_1$. Continuing the present example, each of the 24 output ports labeled 25 to 48 may start sending a locking data segment at time 353,280 on its respective output port time-counter. Taken together, the 24 locking data segments make up a timing message that, among other information, associates the output port time-counter value 353,280 with each of the 24 output ports labeled 25 to 48.

At core node CN2, the master controller 406 receives 24 locking data segments and determines 24 values of $t_2(p)$. For instance, the locking data segment from output port labeled 40 may have arrived at the master controller 406 when the master time counter 514 read 353,278. The core node sends a reply message to edge node EN92 including the value $t_2(40)=353,278$ and 23 other $t_2(p)$ values. The reply message is sent to edge node EN92 in a control data slot. Notably, the control data slot in which the reply message is sent is not necessarily the locking time slot.

When the edge-node controller of edge node EN92 receives the reply messages from core node CN2 indicating a value $t_2(p)$ for each of output ports 25 to 48, a new value $t_0(p)$ is computed as $t_0(p) \leftarrow [t_0(p)+t_1(p)-t_2(p)+H]$ modulo H. For the exemplary port 40, with a present value of $t_0(p)$ of 18, for example, the new value $t_0(p)=[18+353,280-353,278+2^{24}]=(20+2^{24})$ modulo $2^{24}$, i.e., 20. This is representative of the required time-counter reading, relative to the cyclic zero point of the master cycle of the edge-node time-counter 914, at which the master cycle of the output port time-counter at output port 40 should start.

The main difference between time-locking at initialization and steady-state time-locking maintenance is in the method of acquiring the timing messages from the edge nodes 902, as will be described later with reference to FIG. 15. The steady-state time-locking process need only be applied once during a master cycle. There may be several TDM frames per time-counter cycle and each TDM frame has a control data time slot designated to carry control data from an edge node 902 to a core node 240. If there are G>1 TDM frames per master cycle, i.e., G control data time slots per master cycle, then one control data time slot may be used for sending timing, and possibly reconfiguration, data and the remaining (G−1) control data time slots per master cycle can be used for conveying other operational and maintenance data between an edge node 902 and a core node 240.

Figure 12:
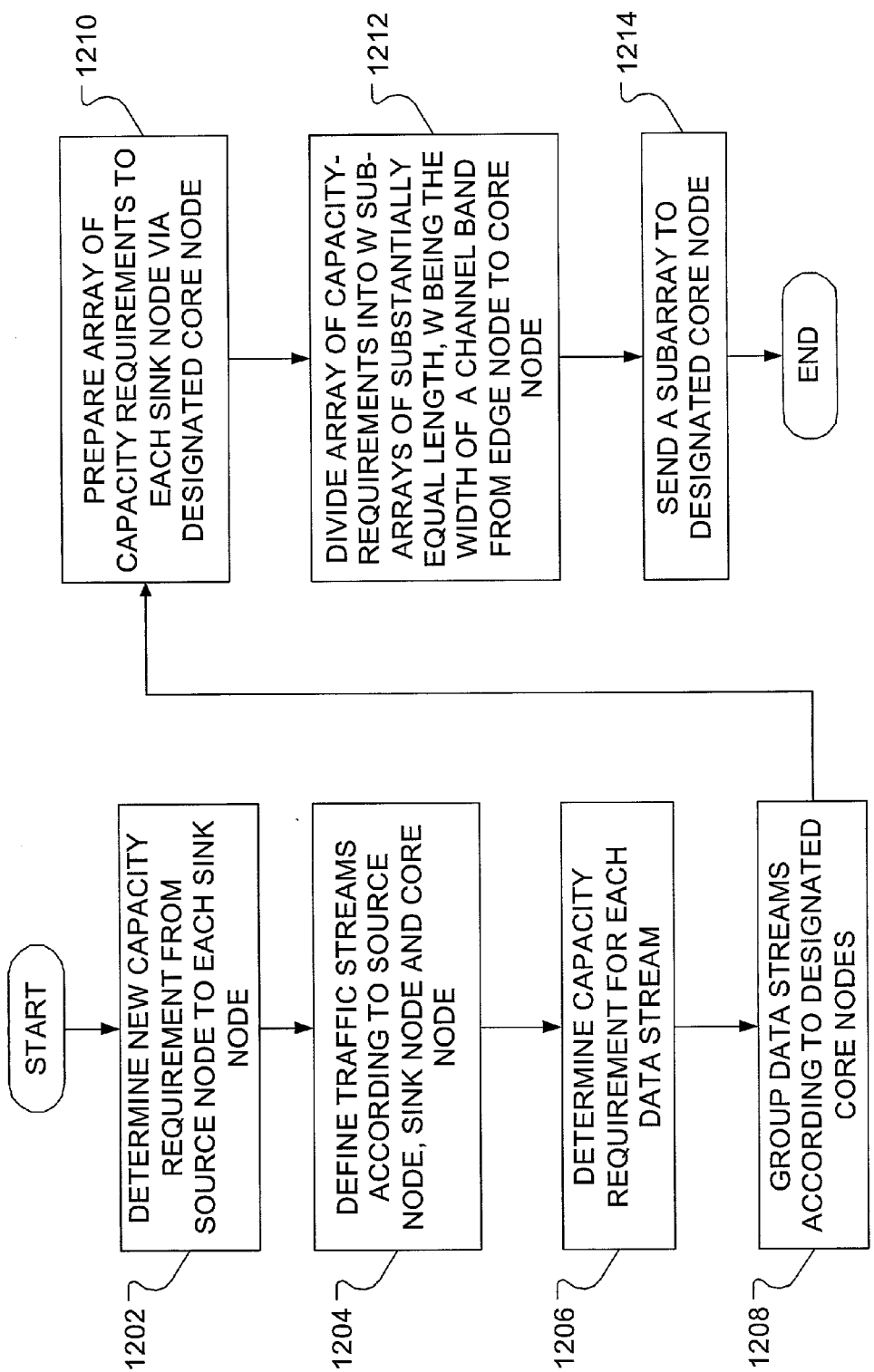
FIG. 12 illustrates steps in a method of time slot scheduling according to an embodiment of the present invention.

FIG. 12 summarizes the capacity-allocation process. Initially, an edge-node controller 912 of an edge node 902 determines its capacity requirements to each sink node based on information it receives from individual source-interface input ports 922 (step 1202). The data traffic from a source node 120 of an edge node 902 to a sink node 160 of another edge node 902 need not be transferred through the same core node. This is especially the case when the volume of the traffic exceeds the capacity of a path through a single core node. The controller of an edge node 902 exercises a route-selection procedure to determine the core node or core nodes to be used for each data-transfer request. Thus, the data from one edge node to another edge node may be divided into two or more data streams. Recall that the data transferred from one edge node to another edge node through a designated core node is called a data stream. The data traffic generated by the sources of the edge node is organized into data streams, where each data stream is defined by its source (edge) nodes 120, its sink (edge) node 160 and a core node 240 (step 1204).

The capacity requirement for each data stream is then determined (step 1206). The capacity requirement for any data stream is expressed as an integer number of time slots in a TDM frame. The data streams are subsequently grouped according to their respective core nodes (step 1208). A list of capacity requirements for data streams to be routed through each core node 240 is then prepared (step 1210). The source edge node connects to each core node via a channel-band (wavelength band) of W channels (wavelengths). Because the entire channel-band is switched in unison, the list of capacity requirements transferred during a control data time slot of a channel-band can be transferred by all channels of the channel-band during the designated control data time slot. Thus, the edge-node controller 912 divides the list of capacity requirements into W sub-arrays of substantially equal lengths (step 1212). Finally, the sub-arrays are transferred to the designated core node 240 during the TDM time slot designated for the channel-band (step 1214).

Figure 13:
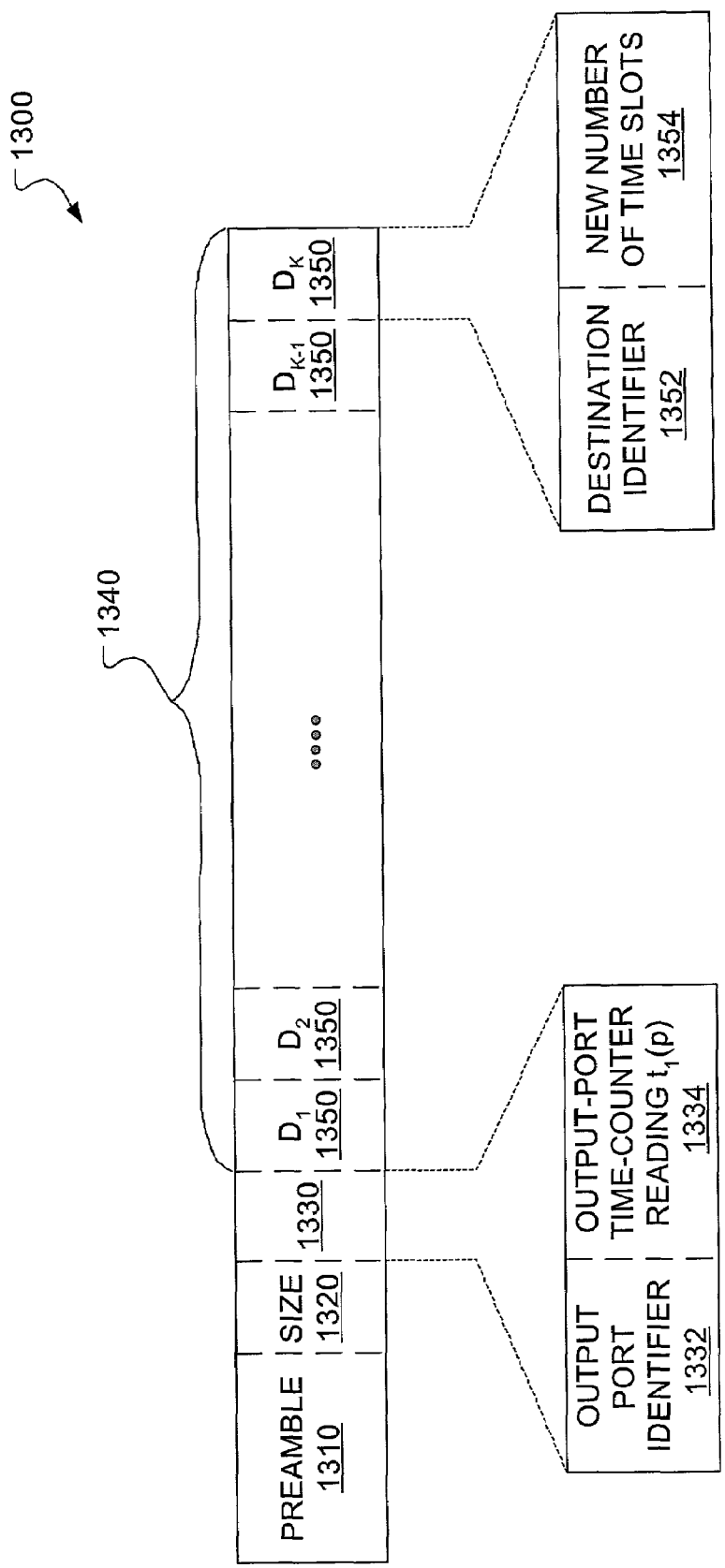
FIG. 13 illustrates the format of a timing message sent from an edge node in an embodiment of the present invention.

Each edge node 902 must communicate both timing data and capacity-requirement data to core nodes 240. The timing data and capacity-requirement data sent to a given core node are preferably grouped into a single message. An exemplary timing message 1300 for inclusion in a locking time slot is illustrated in FIG. 13. The timing message 1300 includes a conventional preamble field 1310, typically of several bytes, to be used for message identification and acquisition. The preamble field 1310 is followed by a size field 1320 for indicating the size of the timing message 1300. The size field 1320 can take several forms; the value contained by the size field 1320 may, for example, indicate a number of subsequent fields of predefined widths. A timing field 1330 contains two parts. The first part, 1332, contains an identifier of a core-interface output port 952 (normally an output port number) in the respective edge node 902. The identifier may be represented by $\lceil \log_2 Q2 \rceil$ bits, where $\lceil . \rceil$ indicates rounding up to nearest integer and Q2 is the number of core-interface output ports 952 in an edge node 902, as defined earlier. The second part, 1334, contains an indication of $t_1(p)$.

As described earlier, the timing message 1300 may also carry capacity-requirement data, and the capacity requirements are reported in sub-arrays, one for each wavelength in a channel-band. A sub-array 1340 contains K records 1350, and each record 1350 corresponds to a destination edge node 902. The number K is determined in step 1212 of FIG. 12, where a list of capacity requirements was partitioned into sub-arrays of capacity requirements. Each record 1350 contains two fields. A first field 1352 contains an identifier of a destination edge node 902, and a second field 1354 indicates a new capacity requirement to the destination indicated in the first field 1352. The destination identifier in the first field 1352 may either be associated with a current data stream or be defining a new data stream. The new capacity requirement is expressed as an integer number of time slots in the TDM frame. If the number of time slots per TDM frame is 1024, then a new capacity requirement varies between 0 and 1023. Note that at least one time slot is designated as a control data time slot. A new capacity of zero indicates that respective currently-allocated time slots, if any, are no longer required. The capacity per time slot in a wavelength band of W wavelength, each modulated to carry R bits per second is W×R/S, where S is number of time slots per TDM frame. With W=32, R=10 Gigabits/second, and S=1024, the capacity per time slot is 312.5 megabits/second, which is significantly high. It is therefore desirable to increase the number of time slots S, i.e., use more time slots per TDM frame, so that the rounding-up waste can be reduced. If the number S of time slots per TDM frame is increased, a data stream may require more time slots, but with less waste. For example, a data stream requiring 4.2 time slots with S=1024, would require 8.4 time slots if S is increased to 2048. The relative round-up waste in the first case is 0.8/5=0.16 and in the second case it is 0.6/9=0.067. Given a time slot duration, an upper bound of the number S is determined by the maximum permissible delay for a data stream of low intensity, which is allocated one time slot per frame and, hence, can only send data once every TDM frame period. With S=1024 and a time slot of about one microsecond, the TDM frame period is about 1 millisecond.

Figure 14:
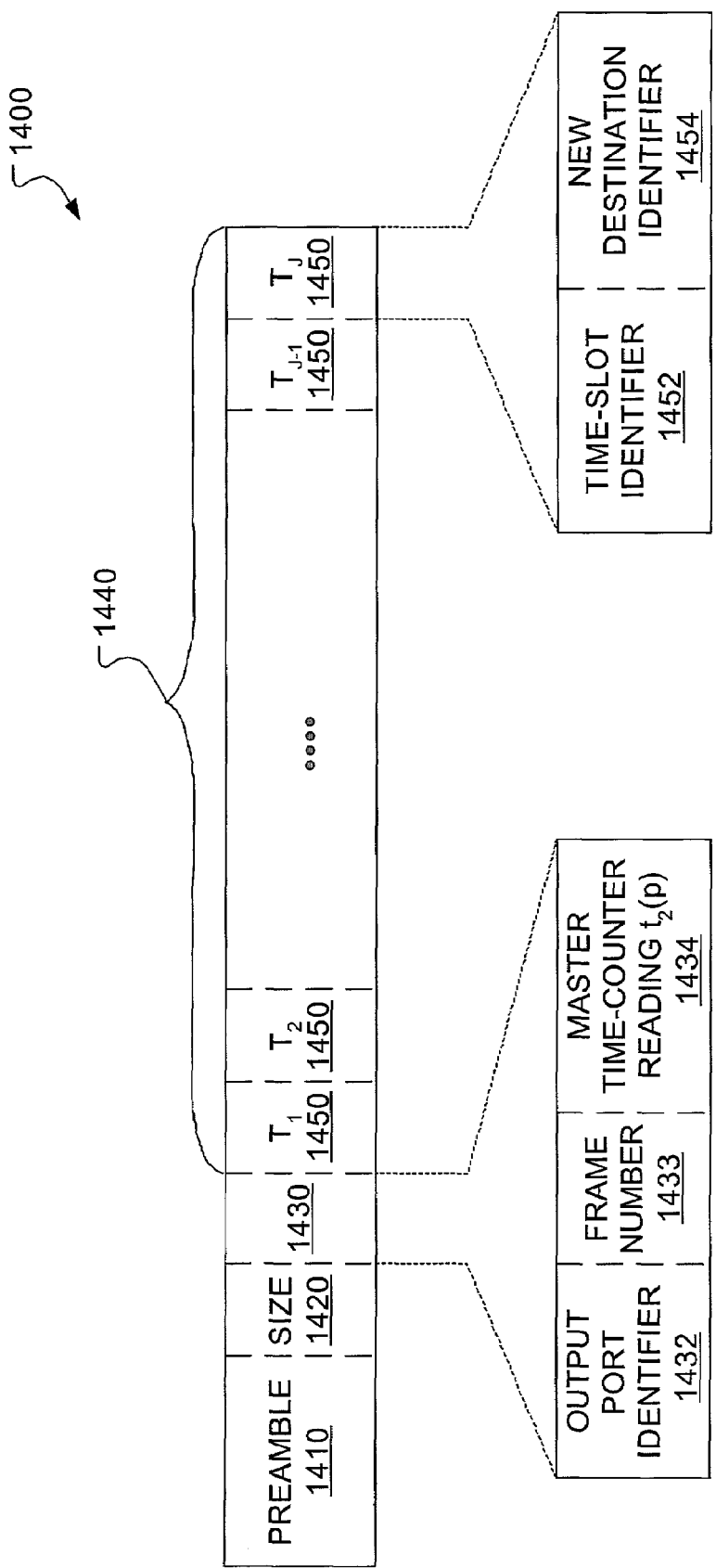
FIG. 14 illustrates the format of a reply message sent from a core node in an embodiment of the present invention.

FIG. 14 illustrates an exemplary format of a reply message 1400 that a core node 240 sends to a source edge node 902 in response to a timing message 1300. The reply message 1400 begins with a conventional message preamble field 1410. A size field 1420 indicates the number of time slots reconfigured, i.e., assigned different output port destination 408. A timing field 1430 is a timing response message that has three sub-fields. The first sub-field 1432 contains an identifier of a core-interface output port 952. The second sub-field 1433 contains the TDM frame number associated with the timing message 1300, i.e., the most significant b1 bits in field 1334 of FIG. 13. The third sub-field 1434 contains the time $t_2(p)$ at which the locking data segment, from a core-interface output port 952 labeled "p", of the timing message 1300 was received at the core node 240. The master controller 406 computes a new switching-time schedule indicating a destination sink node during each time slot, for which a destination change is required, in the TDM frame for each outbound link 230. The new schedule is organized into W sub-arrays, W being the number of channels per inbound link 250. A sub-array 1440 having J>1 elements 1450 is shown in FIG. 14. Each element 1450 in the sub-array 1440 has two fields: a first filed 1452 that contains a TDM frame slot identifier and a second field 1454 that contains an identifier of a new destination sink node associated with an edge node 902.

Figure 15:
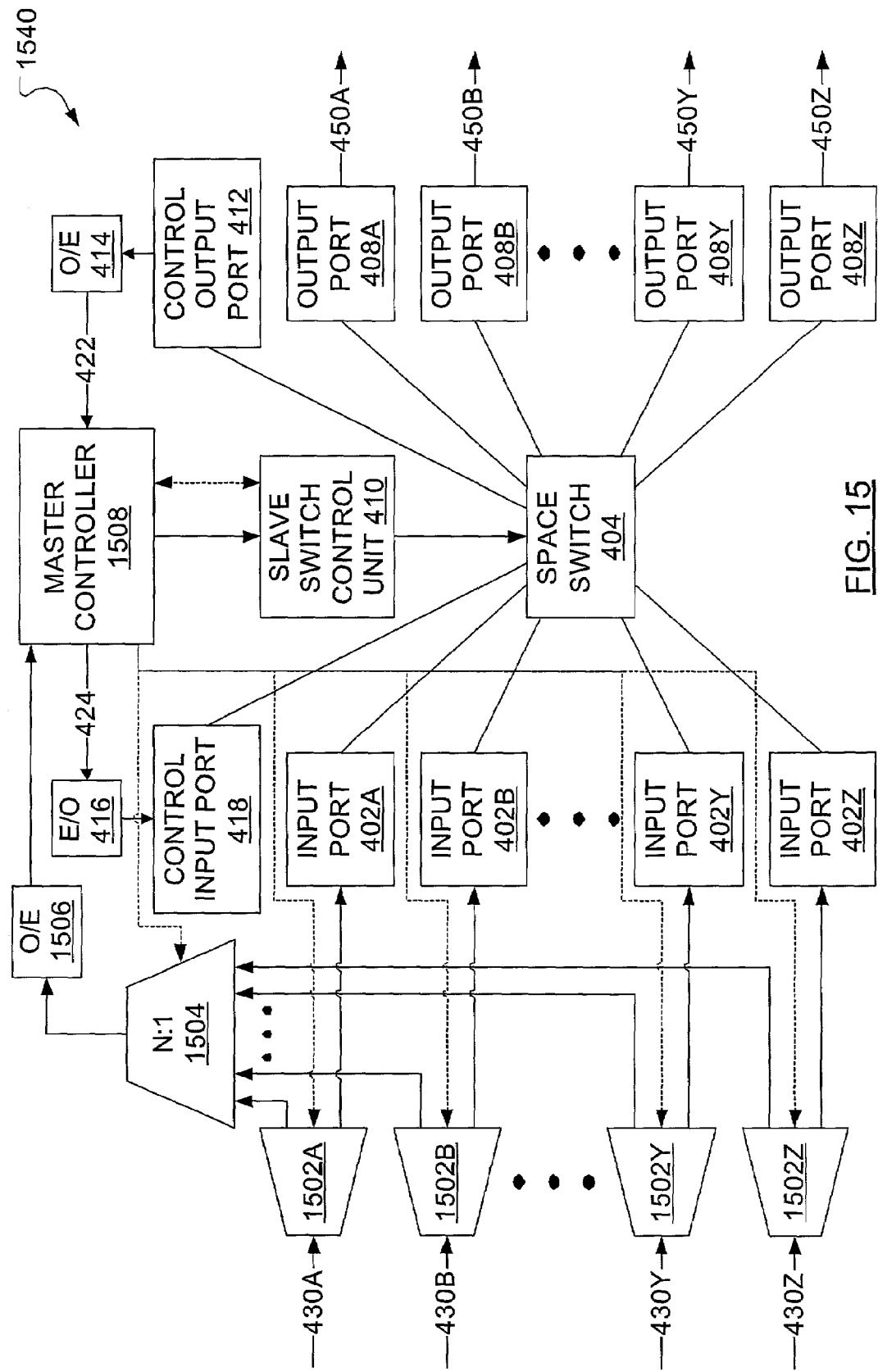
FIG. 15 illustrates a mechanism for enabling the initiation and preservation of time-locking according to an embodiment of the present invention.

FIG. 15 illustrates components added to the core node 240 to enable initiation of time-locking or recovery from a loss of time-locking. Each outbound link 430 feeds a 1:2 switch 1502A, 1502B, ..., 1502Y, 1502Z (referred to collectively and individually as 1502). Under normal conditions, each 1:2 switch 1502 is set to connect an outbound link 430 to its respective input port 402. Under start up, or loss recovery, conditions, a particular 1:2 switch 1502 may be set to connect a respective outbound link 430 to an N:1 selector 1504. The output of the N:1 selector 1504 is then sent to a master controller 1508 via an O/E converter 1506. The de-multiplexing of the multiple wavelength optical signal that arrives at the control output port 412 and subsequent multiplexing of the multiple wavelengths that arrive at the control input port 418 occur as described in conjunction with FIGS. 4A, 4B and 4C. The master controller 1508 detects the loss of time-locking of a channel in a channel-band by inspecting the data received from the channel during its designated control data time slot.

Consider a scenario wherein the master controller 1508 detects the loss of time-locking for a given input port 402B that corresponds to output port 408B, outbound link 430B and 1:2 switch 1502B. The master controller 1508 instructs the 1:2 switch 1502B to connect outbound link 430B to the N:1 selector 1504 instead of input port 402B. The master controller 1508 also instructs the N:1 selector 1504 to select input received from the 1:2 switch 1502B. Concurrently, the master controller 1508 sends instructions to the sink node 160B associated with the source node 160B at the origin of the outbound link 430B. These instructions are sent through the output port 408B associated with the sink node 160B and include a request to send a timing message 1300. The request is repeated at predefined intervals until the requested timing message is received, or until a predefined time window expires. The master controller 1508 must read the data from the outbound link 430B (from source node 120B) continuously due to the loss of time-locking. If the timing message is received, the master controller 1508 replies with the appropriate timing information as described above. If the timing message is not received within the predefined time window, the master controller 1508 may conclude that the affected source node 120B is not functioning. The master controller 1508 may indicate that the source node 120B is not functioning to an administration system. The master controller 1508 then waits for an extended period of time then repeats the locking attempt. If two or more source nodes simultaneously lose time-locking, the time-locking recovery procedure must be applied to these source nodes one at a time. The same procedure is used when the core node 240 is installed, where the source nodes 120 are instructed to time-lock one at a time to avoid collision given the initially complete lack of time-locking.

A sink node 160 (as part of an edge node 902) that is paired with a source node 120 that fails to time-lock to the master controller 1508, is still able to receive data from the master controller 1508 and other source nodes 120.

Figure 16:
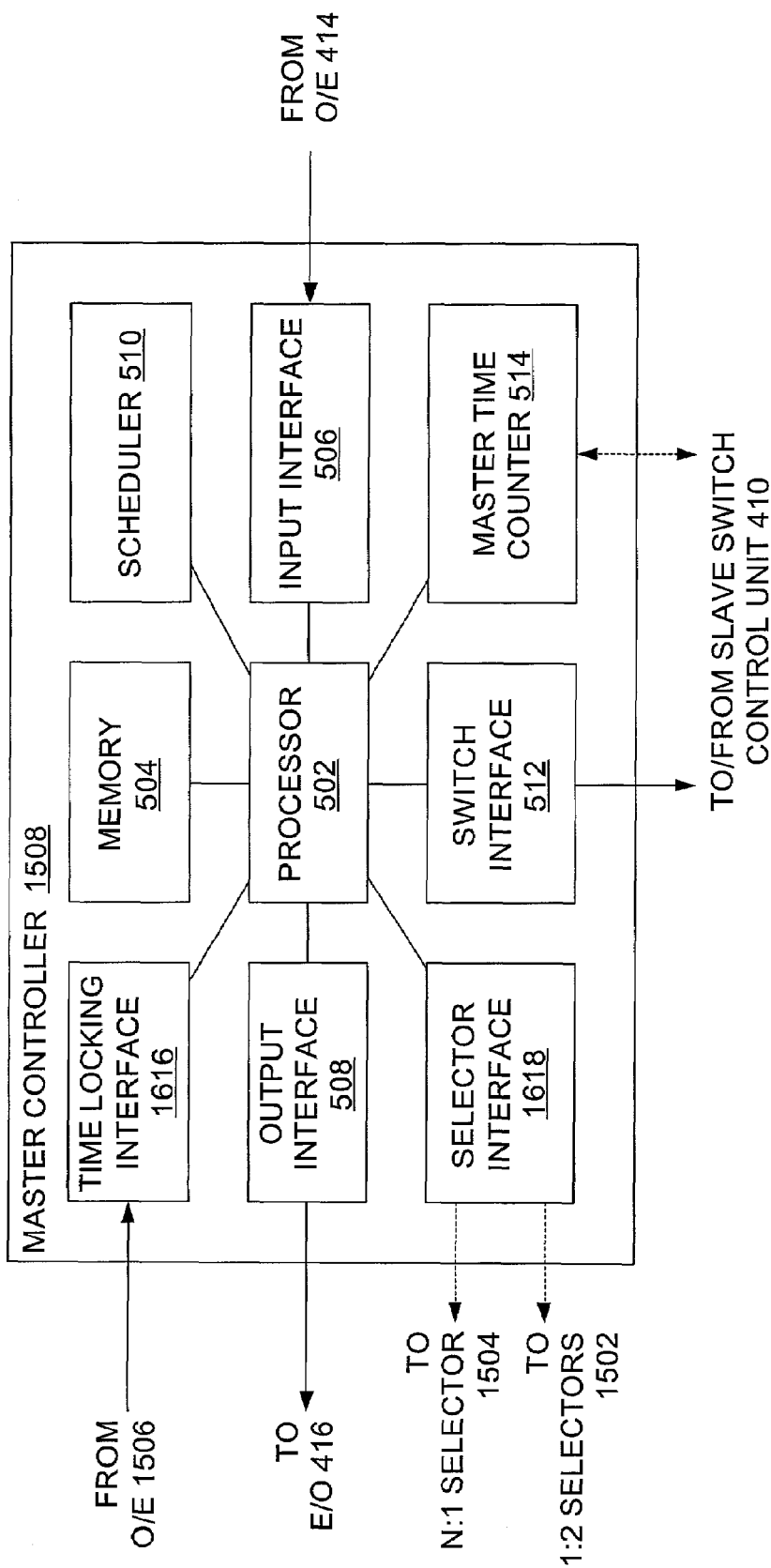
FIG. 16 illustrates an alternative master controller for use in a core node as illustrated in FIG. 15.

FIG. 16 illustrates the master controller 1508 with components added to enable recovery from a loss of time-locking as described in conjunction with FIG. 15. Those elements of the master controller 1508 of FIG. 16 that differ from the elements of master controller 406 of FIG. 5 include a time-locking interface 1616 for receiving input from individual source nodes 120 via a 1:2 selector 1502, the N:1 selector 1504 and the O/E converter 1506. A further difference between the master controller 1508 of FIG. 16 and the master controller 406 of FIG. 5 is the addition of a selector interface 1618 for communicating with the 1:2 selectors 1502 and the N:1 selector 1504. Both the time-locking interface 1616 and the selector interface 1618 maintain a respective connection to the processor 502.

A single space switch may be replaced by a set of parallel space switches obeying the same connection schedule. Each incoming link must then be demultiplexed into narrower wavelength bands and each band is assigned to one of the space switches. The output of the parallel space switches is then multiplexed into links directed to respective sink nodes.

In review, embodiments of the present invention ease the management of switching a frame of time division multiplexed data at a core node, by arranging simultaneous time slots in each channel-band into "stripes," such that a particular stripe only includes data segments having a common destination (e.g., data segments from a single data stream). Switching these stripes, or channel-bands, of data at the core node requires that the source of such a stripe arrange the frame according to a frame structure provided by the core node. Advantageously, where the frame is striped across an entire link, the present invention provides for a variation on link switching that increases topological reach while maintaining relatively straightforward operation at the core node. An edge node sending a channel-band to a core node time-locks a time-counter in the source of each channel in the channel-band to a time-counter in the core node.

The embodiments of the invention described above are intended to be exemplary only. Other modifications will be apparent to those skilled in the art and, therefore, the invention is defined in the claims.

What is claimed is:

1. A method of time-lock recovery at a core node in a composite-star network, said method comprising:
    instructing a switch to connect a link from a source node to a selector;
    instructing said selector to select input received from said switch;
    sending instructions to a sink node associated with said source node, said instructions including a request to send a timing message;
    continuously reading data received from said source node via said selector and said switch;
    if said timing message is received, replying to said timing message with timing information;
    repeating sending instructions at predefined intervals; and
    discontinuing said repeating upon receipt of said timing message.

2. The method of claim 1 further comprising discontinuing said repeating upon expiry of a predefined time window.

3. The method of claim 2 further comprising, if said timing message is not received within said predefined time window, indicating that said source node is not functioning.

4. A core node in a composite-star network comprising:
    a space switch having a plurality of input ports and a plurality of output ports;
    a master controller having a master time indicator;
    a selector having a plurality of selector inputs and a single selector output, said selector output communicatively connected to said master controller;
    a plurality of 1:2 switches, each having a switch input, a first output communicatively connected to one of said input ports of said space switch, and a second output communicatively connected to one of said selector inputs;
    where said master controller:
        instructs one of said 1:2 switches to connect a link from a source node to said selector for time locking said source node to said master time indicator;
        instructs said selector to direct input received from said one of said 1:2 switches to an input port of said master controller;
        sends instructions to a sink node associated with said source node to transmit successive readings of a time indicator associated with said source node;
        continuously reads said successive readings via said selector and said switch;
        determines a time shift between one of said successive readings and a contemporaneous reading of said master time indicator; and
        communicates said time shift to said sink node.

5. The core node of claim 4 wherein said master controller instructs said one of said 1:2 switches to connect said link to said space switch when said time shift reaches a negligible magnitude.

6. The core node of claim 4 wherein said master time indicator is a clock-driven cyclic time counter having a predefined period and said time indicator associated with said source node is a clock-driven time counter having a period equal to said predefined period.

7. The core node of claim 4 wherein said space switch is an optical switch.

8. The core node of claim 4 wherein said selector is an optical selector.

9. The core node of claim 4 wherein each of said 1:2 switches is an optical switch.

10. A network comprising:
    a plurality of source nodes;
    a plurality of upstream multi-channel links communicatively coupled to said plurality of source nodes;
    a plurality of sink nodes;
    a plurality of downstream multi-channel links communicatively coupled to said plurality of sink nodes;
    a plurality of core nodes, each core node communicatively coupled to a subset of said plurality of upstream multi-channel links and a subset of said plurality of downstream multi-channel links;
    a master controller associated with said each core node wherein said master controller:
        receives control data from at least one of said plurality of source nodes;
        generates a schedule for operation of a space switch associated with said each core node based on said control data, said schedule associating at least one of a plurality of time slots, within a multi-channel time division multiplexed frame, with a destination;
        communicates said schedule to at least one of said plurality of sink nodes; and
        maintains time-locking for individual channels in each upstream multi-channel link connecting to said space switch.

11. The network of claim 10 wherein each of said plurality of source nodes is paired with a corresponding one of said plurality of sink nodes to result in a plurality of network edge nodes.

12. A computer readable medium encoded with computer executable instructions which, when performed by a processor in a space switch master controller, cause the processor to:
    receive from a multi-channel input link of a space switch a scheduling request specifying a multi-channel output link of said space switch and capacity allocation;
    generate a schedule for operation of said space switch based on said scheduling request, said schedule associating at least one time slot of a plurality of time slots, within a time division multiplexed frame, with each channel of said multi-channel input link and each channel of said multi-channel output link of said space switch; communicate said schedule to a sink node; and
    transmit instructions to a slave switch control unit for said space switch, where said instructions are based on said schedule.

* * * * *